(12) United States Patent
Dovel

(10) Patent No.: US 9,975,260 B2
(45) Date of Patent: May 22, 2018

(54) CUTTING EDGE WITH MICROSCOPICALLY SIZED CHANNELS TO ENHANCE CUTTING PERFORMANCE

(71) Applicant: Darex, LLC, Ashland, OR (US)

(72) Inventor: Daniel T. Dovel, Shady Cove, OR (US)

(73) Assignee: Darex, LLC, Ashland, OR (US)

( * ) Notice: Subject to any disclaimer, the term of this patent is extended or adjusted under 35 U.S.C. 154(b) by 150 days.

(21) Appl. No.: 15/194,054

(22) Filed: Jun. 27, 2016

(65) Prior Publication Data

US 2016/0303699 A1  Oct. 20, 2016

Related U.S. Application Data

(63) Continuation of application No. 14/686,307, filed on Apr. 14, 2015.

(51) Int. Cl.
| | |
|---|---|
| B24B 3/36 | (2006.01) |
| B26B 9/02 | (2006.01) |
| B21K 11/02 | (2006.01) |
| B23K 26/362 | (2014.01) |
| B23P 15/28 | (2006.01) |
| B24B 3/54 | (2006.01) |
| B23K 26/361 | (2014.01) |

(52) U.S. Cl.
CPC ............ B26B 9/02 (2013.01); B21K 11/02 (2013.01); B23K 26/361 (2015.10); B23K 26/362 (2013.01); B23P 15/28 (2013.01); B24B 3/54 (2013.01)

(58) Field of Classification Search
CPC ......... B26B 9/02; B23K 26/361; B21K 11/02; B24B 3/36; B24B 3/54; B24B 3/58; B24D 15/06; B24D 15/08

USPC .................................. 451/45, 461, 558
See application file for complete search history.

(56) References Cited

U.S. PATENT DOCUMENTS

| | | | | |
|---|---|---|---|---|
| 458,243 A | * | 8/1891 | Townsend ............ | B24D 15/063 451/45 |
| 495,110 A | | 4/1893 | Hayes et al. | |
| 521,755 A | * | 6/1894 | Birch .................. | B24D 15/082 451/461 |
| 1,139,817 A | * | 5/1915 | Smith ................. | B23D 61/026 451/461 |
| 1,158,048 A | | 10/1915 | Hawks | |
| 1,388,547 A | | 8/1921 | Burns | |

(Continued)

FOREIGN PATENT DOCUMENTS

| | | |
|---|---|---|
| CN | 101536925 A | 9/2010 |
| WO | 9414582 A1 | 7/1994 |

*Primary Examiner* — George Nguyen
(74) *Attorney, Agent, or Firm* — Hall Estill Attorneys at Law

(57) ABSTRACT

Apparatus and method for sharpening a cutting tool so as to have enhanced cutting performance. In some embodiments, a tool sharpener is provided having a rigid body with a slot extending therein. A knurl roller is disposed within an internal cavity within the rigid body and mounted for rotation about a selected axis adjacent the slot to facilitate a cold forging operation upon a cutting edge of a cutting tool via insertion of the cutting edge into the slot and retraction of the cutting tool across the knurl roller. An abrasive member is affixed to the rigid body to facilitate a sharpening operation upon the cutting edge by advancement of the cutting edge thereacross.

20 Claims, 16 Drawing Sheets

(56) References Cited

U.S. PATENT DOCUMENTS

| | | | | |
|---|---|---|---|---|
| 1,542,892 | A | 6/1925 | Koenig | |
| 2,059,414 | A | 11/1936 | Taylor | |
| 2,120,096 | A | 6/1938 | Hausman | |
| 2,386,194 | A | 10/1945 | Chester | |
| 2,404,025 | A | 7/1946 | Barnes | |
| 2,555,735 | A | 6/1951 | Estabrooks | |
| 2,636,267 | A | 4/1953 | Whitcomb | |
| 2,713,236 | A | 7/1955 | Goss | |
| 2,749,678 | A * | 6/1956 | Jahn | B24D 15/082 451/461 |
| 3,322,002 | A | 5/1967 | Silberman | |
| 3,509,790 | A | 5/1970 | Hoppe | |
| 3,714,850 | A | 2/1973 | Peters | |
| 3,718,938 | A * | 3/1973 | Blume | A01K 97/00 403/106 |
| 3,741,046 | A | 6/1973 | Chambon | |
| 4,290,326 | A | 9/1981 | Ibach et al. | |
| 4,558,540 | A * | 12/1985 | Collins | B24D 15/08 451/555 |
| 4,627,194 | A | 12/1986 | Friel | |
| 4,841,676 | A * | 6/1989 | Barwasser | B24B 9/146 408/27 |
| 4,907,344 | A | 3/1990 | Hahn | |
| 5,001,945 | A | 3/1991 | Lindeen | |
| 5,040,256 | A * | 8/1991 | Mills | B43L 23/08 30/138 |
| 5,046,385 | A * | 9/1991 | Cozzini | B24D 15/081 451/461 |
| 5,129,187 | A * | 7/1992 | Cain | A63D 15/14 30/494 |
| 5,241,883 | A | 9/1993 | Coppier | |
| 5,317,938 | A | 6/1994 | de Juan et al. | |
| 5,787,591 | A | 8/1998 | Lu | |
| 5,941,761 | A * | 8/1999 | Nagahara | B24B 53/017 451/444 |
| 6,039,642 | A | 3/2000 | Collins | |
| 6,108,915 | A | 8/2000 | Verdier et al. | |
| 6,224,475 | B1 * | 5/2001 | May | B24D 15/084 30/298.4 |
| 6,260,280 | B1 | 7/2001 | Rapisardi | |
| 7,523,846 | B2 | 4/2009 | Takamatsu et al. | |
| 8,020,473 | B2 * | 9/2011 | Tsai | B23D 71/04 451/461 |
| 8,043,143 | B2 | 10/2011 | Elek et al. | |
| 8,056,454 | B2 | 11/2011 | Diaz | |
| 8,221,199 | B2 * | 7/2012 | Smith | B24B 3/54 451/461 |
| 8,460,071 | B2 | 6/2013 | Masseilot | |
| 9,039,494 | B1 * | 5/2015 | Dovel | B24D 15/08 451/349 |
| 9,068,260 | B2 | 6/2015 | Carlisle | |
| 2003/0226579 | A1 | 12/2003 | Carrier | |
| 2004/0116056 | A1 * | 6/2004 | Hovsepian | B24D 15/02 451/461 |
| 2005/0115084 | A1 | 6/2005 | Hasegawa | |
| 2006/0101649 | A1 | 5/2006 | Chen | |
| 2007/0039445 | A1 | 2/2007 | Nitsch | |
| 2008/0039001 | A1 * | 2/2008 | Evans | B24D 15/08 451/558 |
| 2008/0121079 | A1 | 5/2008 | Hashimoto et al. | |
| 2009/0188113 | A1 | 7/2009 | McKeeth et al. | |
| 2011/0132954 | A1 | 6/2011 | Tomei et al. | |
| 2011/0232108 | A1 | 9/2011 | Ochial et al. | |
| 2012/0079728 | A1 | 4/2012 | Sjoholm | |
| 2012/0192429 | A1 | 8/2012 | Savarese | |
| 2013/0036616 | A1 | 2/2013 | Wagenknecht | |

* cited by examiner

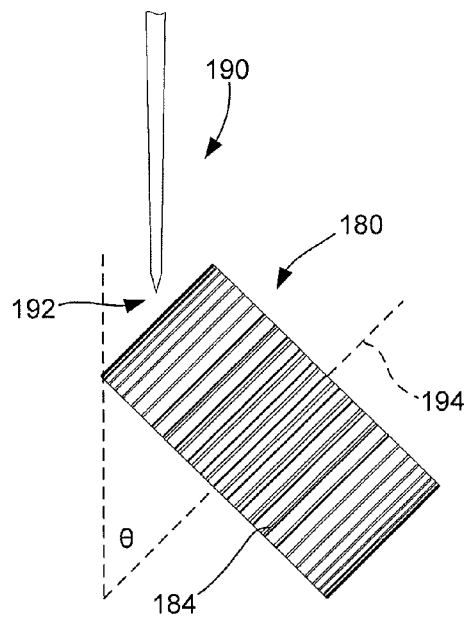
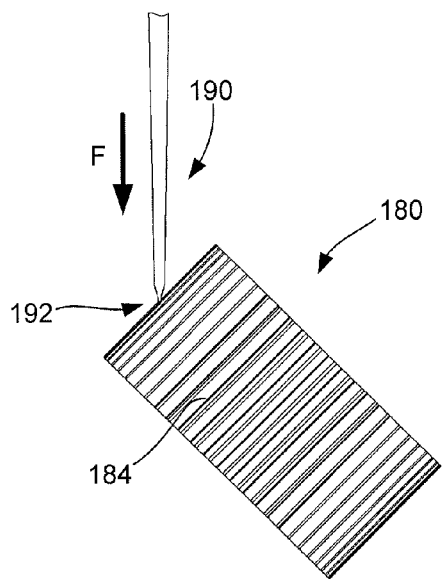
FIG. 6A    FIG. 6B
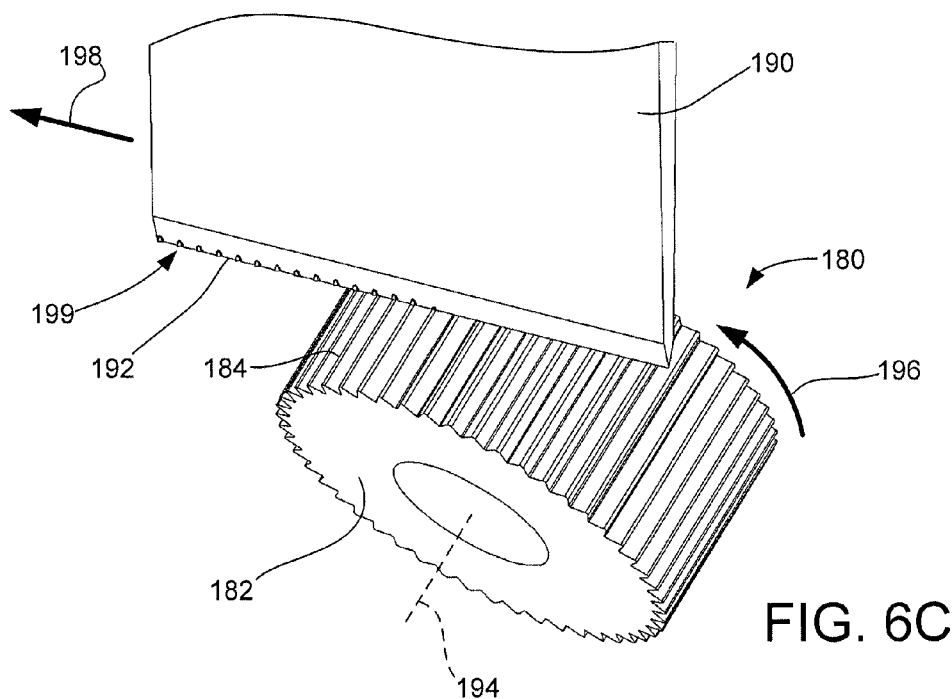
FIG. 6C

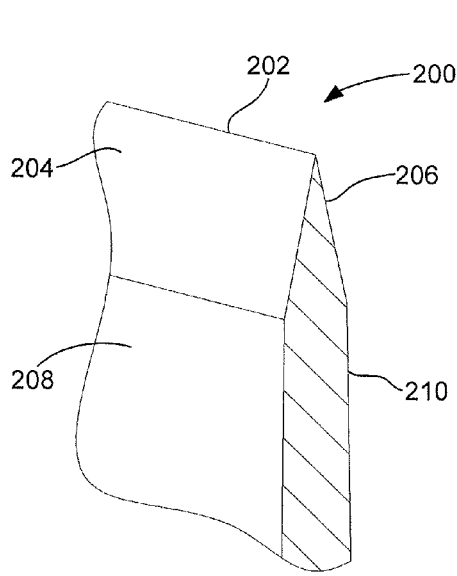
FIG. 7A
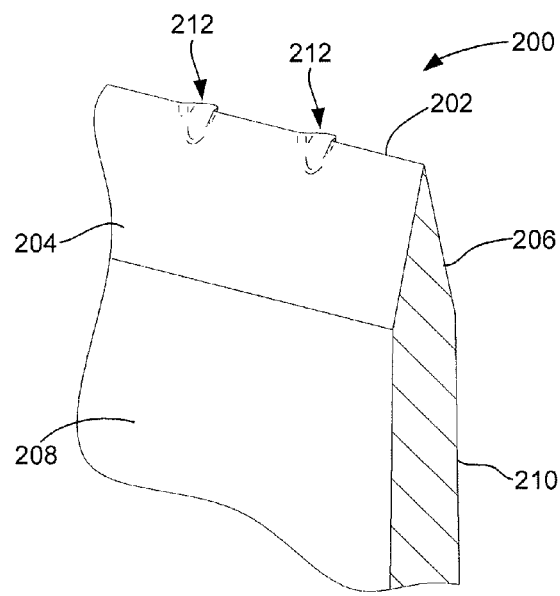
FIG. 7B
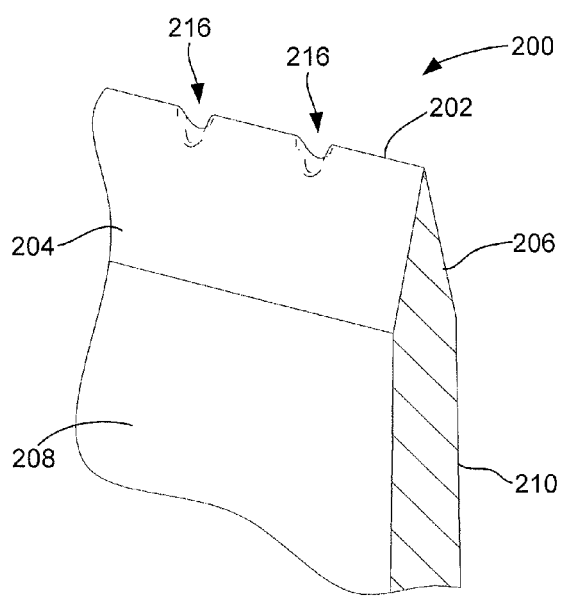
FIG. 7D
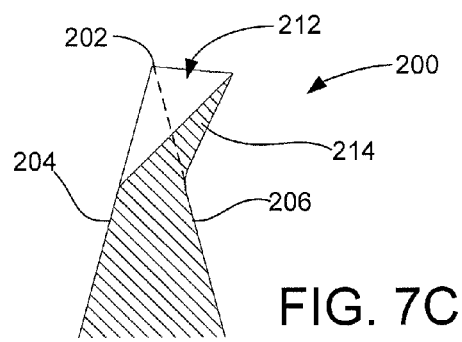
FIG. 7C
FIG. 7E

NOTCHED EDGE – 45 DEGREES – FRONT

NOTCHED EDGE – 45 DEGREES – BACK

NOTCHED EDGE – 90 DEGREES - FRONT

NOTCHED EDGE – 90 DEGREES - BACK

FINE EDGE – SHARPENED

COARSE (FACTORY) EDGE – SHARPENED

FINE EDGE – DULLED

COARSE (FACTORY) EDGE – DULLED

NOTCHED EDGE – 45 DEGREES – FRONT - DULLED

| MONTH | REFINED EDGE | FACTORY EDGE | MICRO-FORGED |
|---|---|---|---|
| 0 | 98% | 93% | 91% |
| 1 | 29% | 51% | 59% |
| 2 | 21% | 35% | 50% |
| 3 | 4% | 25% | 46% |
| 4 | 0% | 23% | 44% |
| 5 | 0% | 23% | 44% |
| 6 | 0% | 21% | 45% |
| 7 | 0% | 19% | 45% |
| 8 | 0% | 18% | 45% |
| 9 | 0% | 15% | 44% |
| 10 | 0% | 16% | 46% |
| 11 | 0% | 15% | 45% |
| 12 | 0% | 13% | 46% |

CUTTING EDGE WITH MICROSCOPICALLY SIZED CHANNELS TO ENHANCE CUTTING PERFORMANCE

RELATED APPLICATION

The present application is a continuation of U.S. patent application Ser. No. 14/686,307 filed Apr. 14, 2015, the contents of which are hereby incorporated by reference.

BACKGROUND

Cutting tools are used in a variety of applications to cut, separate or otherwise remove material from a workpiece. A variety of cutting tools are well known in the art, including but not limited to knives, scissors, shears, blades, chisels, spades, machetes, saws, drill bits, etc.

A cutting tool often has one or more laterally extending, straight or curvilinear cutting edges along which pressure is applied to make a cut. The cutting edge is often defined along the intersection of opposing surfaces that intersect along a line that lies along the cutting edge.

Cutting tools can become dull over time after extended use. It can thus be desirable to subject a dulled cutting tool to a sharpening operation to restore the cutting edge to a greater level of sharpness. A variety of sharpening techniques are known in the art, including the use of grinding wheels, whet stones, abrasive cloths, etc. While these and other sharpening techniques have been found operable, there is a continued need for improved blade configurations that extend cutting performance by reducing the need for frequent resharpening operations.

SUMMARY

Various embodiments of the present disclosure are generally directed to an apparatus and method for shaping a cutting tool so as to have enhanced cutting performance.

In some embodiments, a tool sharpener is provided having a rigid body with a slot extending therein. A knurl roller is disposed within an internal cavity within the rigid body and mounted for rotation about a selected axis adjacent the slot to facilitate a cold forging operation upon a cutting edge of a cutting tool via insertion of the cutting edge into the slot and retraction of the cutting tool across the knurl roller. An abrasive member is affixed to the housing to facilitate a sharpening operation upon the cutting edge by advancement of the cutting edge thereacross.

In other embodiments, a method for sharpening a cutting tool includes steps of inserting a cutting edge of a cutting tool into a slot of a rigid body of a tool sharpener; retracting the cutting edge across a rotatable knurl roller disposed within an internal cavity of the rigid body to facilitate a cold forging operation upon the cutting edge; and subsequently advancing the cutting edge of the cutting tool along an abrasive member affixed to the housing to facilitate a sharpening operation upon the cutting edge.

In further embodiments, the method sharpens a cutting tool having a blade with a cutting edge, the blade extending from a handle, the method having steps of providing a tool sharpener having housing, a knurl roller disposed within the housing for rotation about a selected axis adjacent a slot, and an abrasive member coupled to the housing; grasping the cutting tool using a hand of a user and inserting the blade into the slot; drawing the cutting edge across the knurl roller by using the hand of the user to retract the handle along a selected direction, the knurl roller forming spaced apart channels along a length of the cutting edge; and using the hand of the user to subsequently move the cutting edge along the abrasive member to sharpen the cutting edge and remove material from the blade displaced by the knurl roller.

These and other aspects of various embodiments of the present disclosure will become apparent from a review of the following detailed description in conjunction with the accompanying drawings.

BRIEF DESCRIPTION OF THE DRAWINGS

FIG. 6A-6C depict a cold forging operation using the knurl of FIG. 5A-5C to form channels of the types generally illustrated in FIGS. 2A-4C in accordance with some embodiments.

FIGS. 7A-7E show a fine edge blade subjected to cold forging processing in accordance with FIGS. 6A-6C.

DETAILED DESCRIPTION

Figure 1:
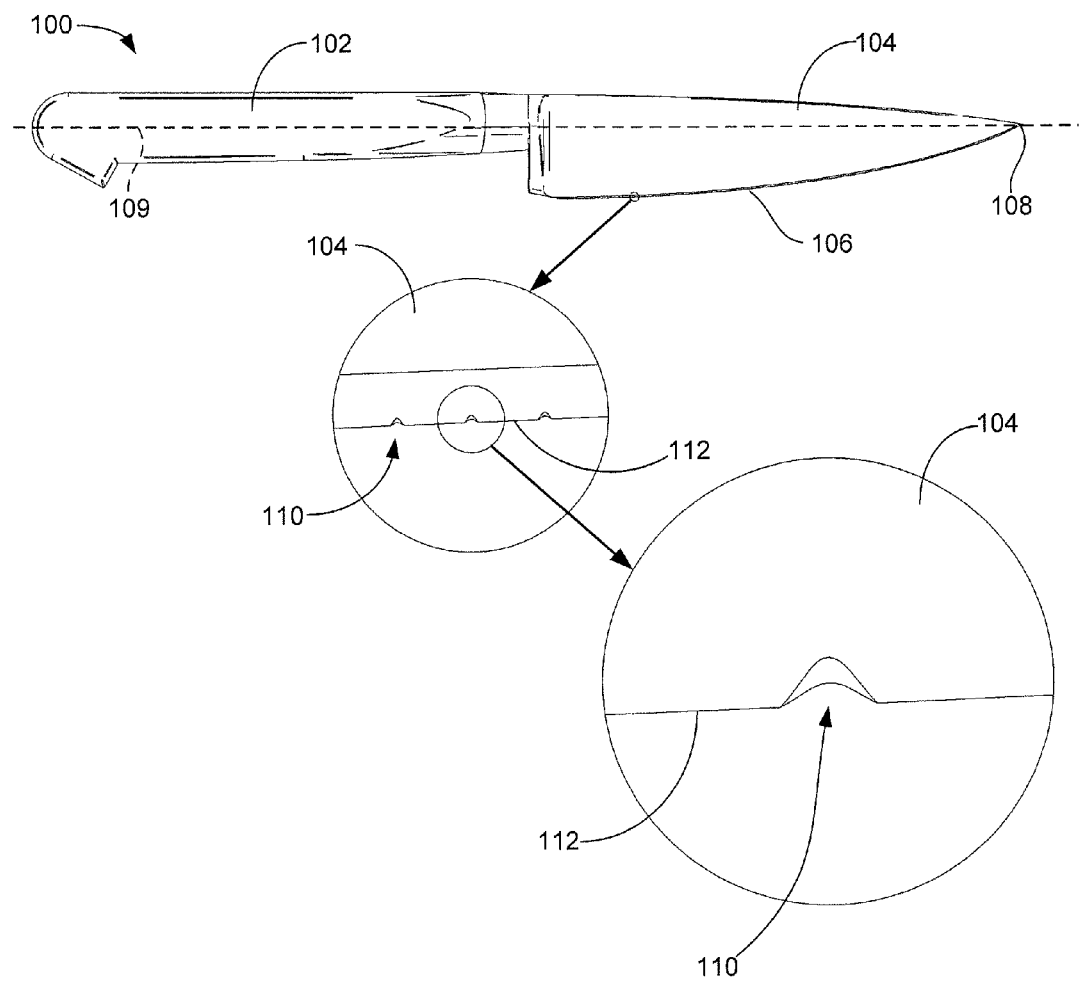
FIG. 1 is an exemplary cutting tool having microscopically sized channels formed in accordance with various embodiments of the present disclosure.

FIG. 1 shows an exemplary cutting tool 100 constructed in accordance with some embodiments. As explained below, the cutting tool has a specially configured cutting edge with a number of microscopically sized channels configured to enhance the cutting performance of the tool. The channels extend the operational life of the tool by maintaining the cutting edge in an effectively "sharp" condition, thereby reducing the need to apply resharpening operations to the tool.

The cutting tool 100 is characterized as a kitchen knife, although such is merely exemplary and is not limiting as the channels disclosed herein can be applied to substantially any type of cutting tool. The knife 100 includes a handle 102 and a blade 104. The handle 102 is sized to be grasped by the hand of a user during cutting operations. The blade 104 has a continuously extending cutting edge 106 which extends along the length of the blade from a position proximate the handle 102 to a distal end 108 of the knife. The handle 102 and blade 104 are aligned along a central axis 109 of the knife that extends along a longitudinal direction of the blade.

The knife 100 includes a plurality of microscopically sized, spaced apart channels (also referred to herein as recesses or grooves) 110 in the cutting edge 106. As further shown in FIGS. 2A-2E, the channels 110 provide relatively small discontinuous zones between continuous segments 112 of the cutting edge 106. Each channel 110 is formed by an interior sidewall 114 that extends into the body of the blade 104 from a first side surface 116 to a second side surface 118 of the blade. A base portion of the sidewall, best viewed in FIG. 2E, is oriented at a selected angle θ with respect to a medial (in this case, vertical) plane that extends through the cutting edge 104.

More details concerning the channels 110 will be given below, but at this point it will be understood that the channels are relatively small, such as on the order of around 0.005 inches, in. (about 125 micrometers, um or microns) in width along the length of the cutting edge 106. Other sizes and shapes can be used.

Because of their microscopic scale, in most cases the channels 110 (or aspects thereof) will tend to be invisible to the human eye and will not generally be observable without the assistance of optically enhancing visual equipment (e.g., a microscope or other magnification mechanism). This is not necessarily limiting, however; in other embodiments the presence of the channels 110 themselves may be visually detectable by a human observer if the channels have sufficient width, but the presence of the notches (the shallowest cross-section of the channels) may not be visible to the unaided human eye.

Figure 2A:
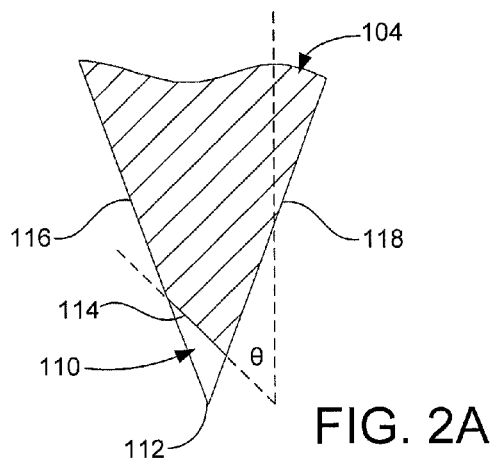
FIG. 2A is a cross-sectional side elevational view of a portion of the cutting tool to illustrate one of the channels of FIG. 1.
Figure 2C:
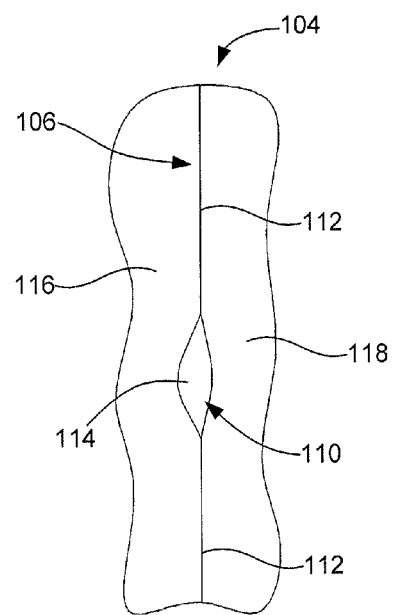
FIG. 2C is a top plan depiction of the channels of FIG. 1.
Figure 2B:
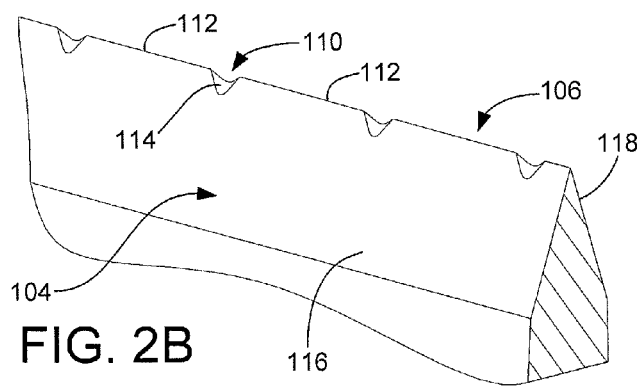
FIG. 2B is an isometric depiction of the channels of FIG. 1.
Figure 2D:
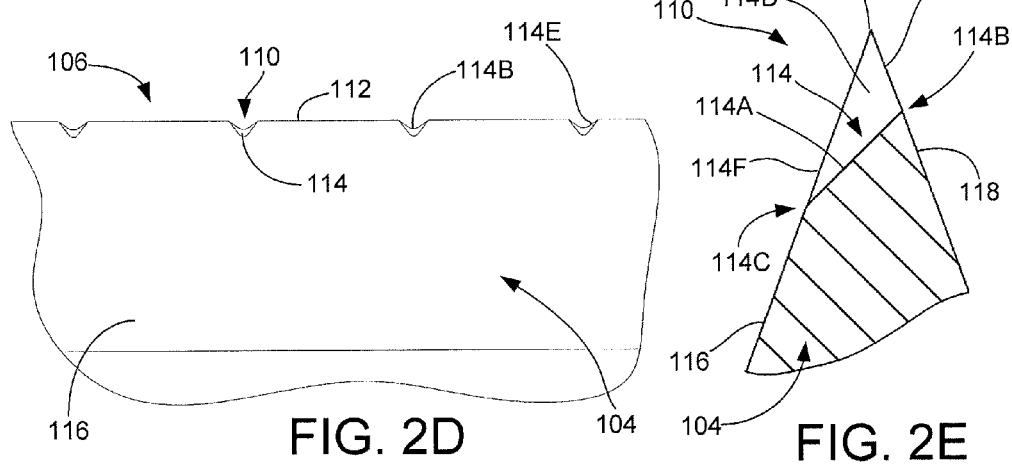
FIG. 2D is a side elevational depiction of the channels of FIG. 1.
Figure 2E:
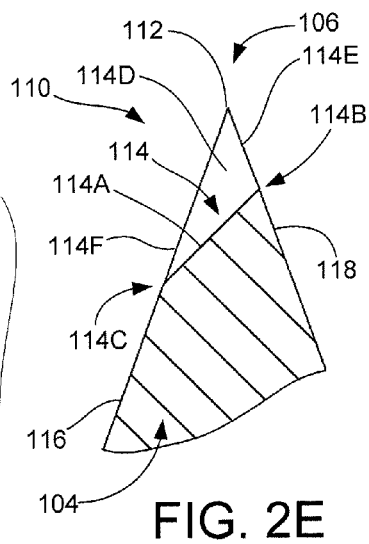
FIG. 2E is a detailed cross-sectional side elevational view of a selected channel from FIG. 1.

FIG. 2E provides further details regarding the geometry of the exemplary channel 110. As noted above, the interior sidewall 114 is generally u-shaped and includes a lowermost base portion, or base surface 114A that extends at the selected angle θ from first (upper) edge 114B to a second (lower) edge 114C. Side surfaces 114D extend upwardly from the base surface 114A as shown to form a substantially triangular "tooth" bounded by opposing edges 114E and 114F. Edges 114B and 114E curvilinearly extend up to segment 112 to form a recessed cutting edge.

For reference, the cross-sectional area of the shallow opening defined by the recessed cutting edge (edges 114B and 114E) will be referred to herein as a "notch" or a "cutting notch." The channel 110 forms a second, larger (recessed) notch bounded by edges 114C and 114F opposite the smaller cutting notch. The bottom of the channel 110 is deepest along edge 114C and is shallowest along edge 114B.

In one illustrative embodiment, the channels in FIGS. 2A-2E have each have a width of about 0.004 in (about 100 um), a pitch (distance from the center of one channel to the next immediate channel) of about 0.020 in.(about 500 um), a cutting notch depth (vertical distance from segment 112 to edge 114B) of about 0.002 in. (about 50 um), and a recessed notch depth (vertical distance from segment 114 to edge 114C of about 0.004 in. (about 100 um). Other dimensions can be used. In some cases, the cutting notch depth will range from about 0.0003 in (about 8 um) to about 0.005 in. (about 125 um). This represents the shallowest depth of the channel.

It can be seen in FIG. 2E that the resulting angle between base surface 114A and side surface 118 is acute (e.g., less than 90 degrees), and the resulting angle between the base surface 114A and side surface 116 is obtuse (e.g., between 90 degrees and 180 degrees). Using a selected angle of 90 degrees for the base surface 114A (so that the base surface 114A is horizontal in FIG. 2E) would make these two opposing angles equal and would provide the channel with a constant notch depth and two opposing cutting notches of equal size.

It has been discovered by the inventor that recessed cutting edges formed by the cutting notches such as illustrated in FIG. 2E contribute to maintaining the cutting tool 100 in an effectively "sharp" condition, thereby prolonging the cutting efficiency of the blade. While not limiting, it is believed that the recessed nature of the cutting edges protects the edges 114B, 114E from being dulled responsive to contact by the exposed segments 112 to a cutting medium.

At the same time, the microscopic scale of the cutting notches and the spacing between adjacent channels 110 have further been found to contribute to the enhancement of the cutting efficiency of the blade since the "teeth" formed by side surfaces 114D and edges 114B and 114E are small enough to separate individual or small numbers of fibers in the cutting medium during a cutting operation. This is true irrespective of the angle θ, so that even if the angle θ is substantially equal to 90 degrees, the cutting edges formed therefrom (e.g. surfaces 114B and 114E) remain sharp irrespective of dulling operations upon the segments 112. These and other aspects of various embodiments will be discussed in detail below.

While a variety of manufacturing techniques can be used to form the channels 110, in some embodiments a cold forging process is used to deform localized portions of the blade. As desired, a secondary honing operation can be applied to remove a portion of the displaced material and align the distal extents of the channels 110 with remaining surfaces of the blade 104.

Figure 3A:
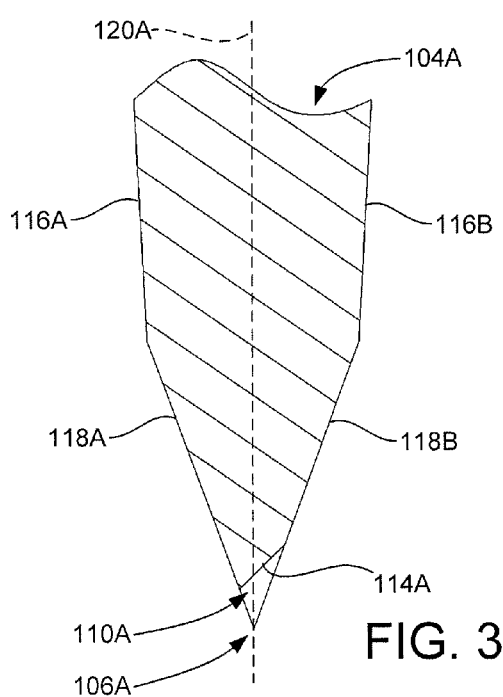
FIGS. 3A-3D illustrate cross-sectional profiles of different exemplary cutting tools having channels similar to those set forth in FIGS. 2A-2E.

FIGS. 3A-3D show that the channels can be applied to knives and other tools with a variety of different sharpening geometries. FIG. 3A is a blade 104A with a symmetric multi-stage tapered geometry. The blade 104A includes opposing linear first and second primary side surfaces 116A, 116B and first and second tapered side surfaces 118A, 118B. The first and second primary side surfaces 116A, 116B extend at a first selected angle with respect to a medial plane 120A orthogonal to a central axis (e.g., 109, FIG. 1) of the tool. The first and second tapered side surfaces 118A, 118B converge at a second selected angle greater than the first selected angle to a cutting edge 106A. The first and second intervening angles may be on the order of around 10 degrees and 25 degrees, respectively, although other values may be used.

A channel 110A is formed by an interior sidewall 114A that extends into the body of the blade 104A and forms a localized discontinuity in the cutting edge 106A. A base portion of the sidewall 114A extends at a selected angle θ (see FIG. 2A). The angle can vary as required; in FIG. 3A, the angle is about 45 degrees with respect to the medial plane 120A.

Figure 3B:
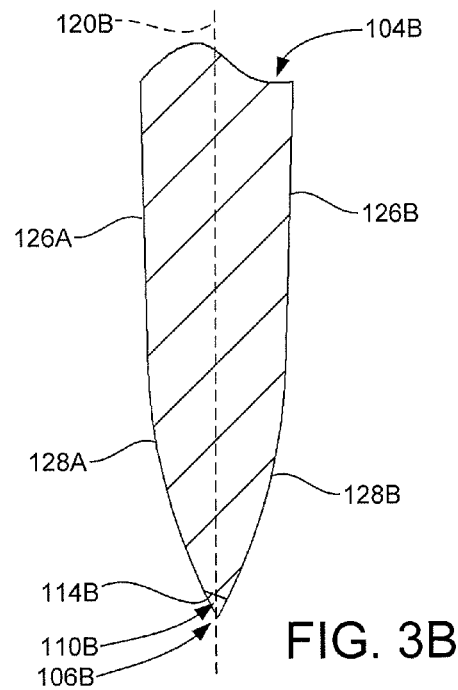

FIG. 3B shows a portion of a blade 104B with a multi-stage convex grinding geometry. Rather than having linear (e.g. flat) facets as in FIG. 3A, the blade 104B in FIG. 3B includes opposing curvilinear first and second primary side surfaces 126A, 126B and curvilinear first and second tapered side surfaces 128A, 128B. The first and second primary side surfaces 126A, 126B have a first radius of curvature and, via medial tangential lines (not shown), extend at a first selected angle with respect to a medial plane 120B. Similarly, the first and second tapered side surfaces 128A, 128B converge to a cutting edge 106B (via medial tangential lines, not shown) at a second selected angle greater than the first selected angle. A channel 110B is formed by a sidewall 114B with a base portion that extends from the first tapered side surface 128A to the second tapered side surface 128B, which in this case is shown to extend at an angle of about 70 degrees with respect to the medial plane 120B.

Figure 3C:
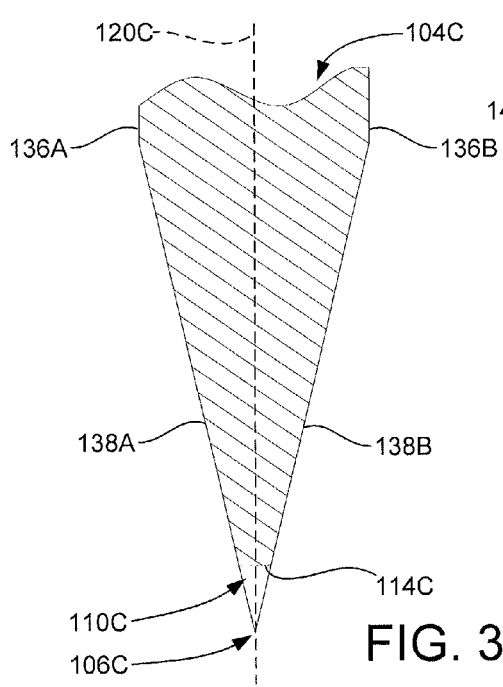

FIG. 3C shows a blade 104C with a hollow grind configuration. Opposing first and second primary surfaces 136A/136B extend at a first angle, and first and second tapered surfaces 138A/138B converge at a second tangential angle to cutting edge 106C about medial plane 120C. Interior sidewall 114C of channel 110C extends at about 90 degrees to the plane 120C.

Figure 3D:
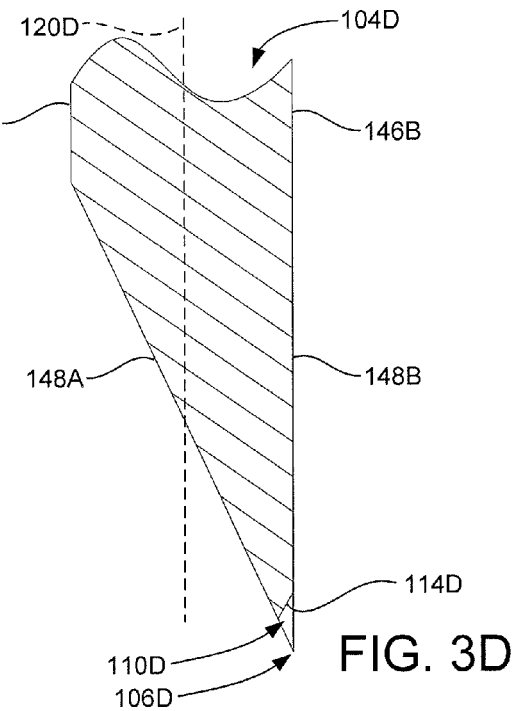

FIG. 3D shows a blade 104D with a single sided grind configuration with opposing first and second primary surfaces 146A/146B and opposing first and second tapered surfaces 148A/148B which taper as before to cutting edge 106D about medial plane 120D. In this case, surfaces 146B and 148B are coplanar. Interior sidewall 114D of channel 110D extends at about 75 degrees with respect to plane 120D.

Figure 4A:
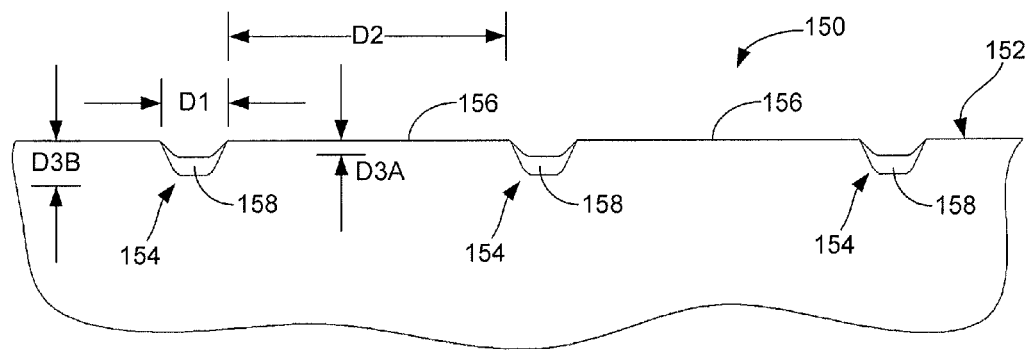
FIGS. 4A-4C illustrate different exemplary configurations of channels in accordance with further embodiments.
Figure 4B:
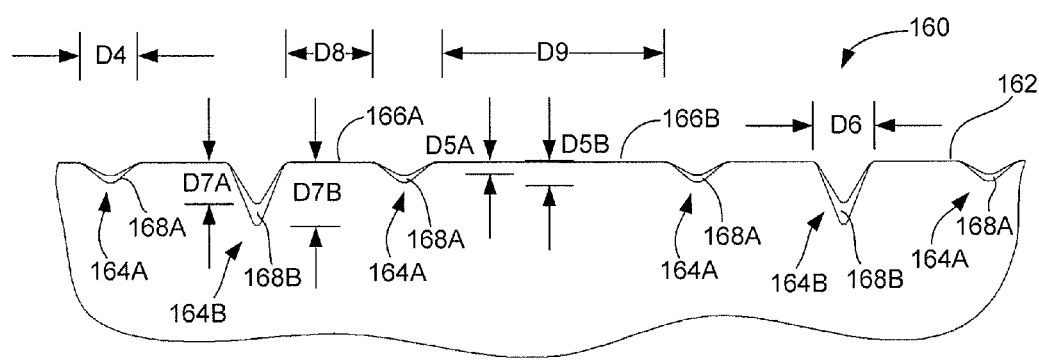
Figure 4C:
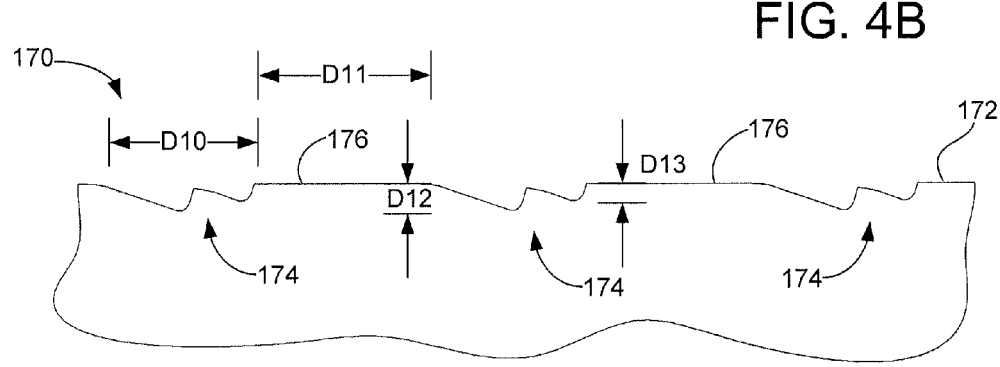

FIGS. 4A-4C illustrate exemplary geometries that can be applied to the channels discussed above. Other geometries can be used. In each case, a blade is supplied with a regular (repeating) pattern of channels that extend along the entirety of, or a portion of, the cutting edge of the blade.

FIG. 4A provides a blade 150 with a cutting edge 152 and spaced apart channels 154 each having a substantially trapezoidal cross-section. The channels 154 provide periodic discontinuities along the cutting edge 152 so as to define intervening segments 156 between adjacent pairs of the channels. The channels 154 are formed by interior sidewalls 158 each having a substantially trapezoidal shape.

Each channel 154 has a channel width D1 along the length of the cutting edge 152 (which corresponds to the length of the blade 150). Each segment 156 has a width (segment length) D2 along the length of the blade 150, with D2 greater than or equal to D1. In some embodiments, the ratio of D2 to D1 will be in the range of from about 1:1 up to about 6:1 or more. In other embodiments, the lower end of the range is equal to or less than 1:1; the lower end of the range is about 3:1; the upper end of the range is about 8:1; or the upper end of the range is about 16:1. Other ratios can be used.

One suitable ratio within these ranges has been found to be about 3:1, so that D2 is about three times (3×) the width of D1. Another suitable ratio within these ranges has been found to be about 5:1, so that D2 is about five times (5×) the width of D1. The ratio will depend on a variety of factors including the mechanism used to form the channels, the blade material, the width, depth and shape of the channels, etc.

While the sizes of D1 and D2 can vary, in some embodiments the channel width D1 is in the range of from about 0.001 in. to about 0.020 in. (about 25 micrometers, μm to about 500 μm), and the segment length D2 is in the range of from about 0.010 in. to about 0.060 in (about 250 μm to about 1500 μm). This maintains the respective features in a microscopic scale so that the features are substantially not visible to the unaided human eye. In this way, a casual user may not be aware of the presence of the features on the blade. It will be noted at this point that the inability to visually detect the presence of the channels will not be limiting to the scope of the claims below, but rather is a beneficial feature of many embodiments disclosed herein. Nevertheless, it will be appreciated that even if the channels are visible, a channel notch depth of from about 0.0003 in to about 0.005 in. will tend to prevent the unaided human eye from sensing the notches themselves along the cutting edge.

A dimension D3A in FIG. 4A denotes the overall (minimum) depth of the cutting notch of the channel 154 at the shallowest (far) end of the channel. A dimension D3B is the overall depth of the channel at the deepest (near) end of the channel. These depth dimensions can vary based on a number of factors including the force used during the formation of the channels, the angle of the interior base sidewall, etc. As noted above, the depth dimension D3A of the recessed cutting edge (cutting notch) can range from about 0.0003 in. up to about 0.005 in. Other ranges can be used depending on the requirements of a given application.

Generally, the deeper the channel, the more durable the channels will be so that the channels persist and are not eroded from the blade as quickly after repeated cutting and sharpening/honing operations. Nevertheless, it is contemplated that the channel depths are restricted to a relatively small range so as to be limited to the proximity of the cutting edge of the blade; that is, the sides of the channel extend through the opposing tapered surfaces of the blade and do not penetrate the primary surfaces of the blade (see e.g., respective tapered surfaces 118A, 118B and respective primary surfaces 116A, 116B in FIG. 3A).

The embodiment of FIG. 4A uses uniformly sized channels 154 with a nominally constant channel pitch so that essentially the same spacing (e.g., the same channel pitch) is provided from the center of one channel to the next. FIG. 4B illustrates another exemplary blade 160 with variably sized and variably pitched channels. A cutting edge 162 has v-shaped channels formed therein denoted as 164A and 164B. Intervening segments 166A, 166B are disposed between adjacent pairs of the channels and have varying lengths. The channels 164A are relatively smaller than the channels 164B and are formed by substantially v-shaped interior sidewalls 168A, 168B. The sequence shown in FIG. 4B is a regular pattern repeated along the length of the blade 160 (e.g., along cutting edge 162).

The smaller channels 164A have a width D4 and respective notch depths D5A and D5B, the larger channels 164B have a width D6 and respective notch depths D7A and D7B, and segments 166A, 166B have respective, regularly reoccurring lengths D8 and D9. While these respective dimensions vary, the above ranges and ratios discussed in FIG. 4A generally apply to the features in FIG. 4B as well. For example, D8>D4, D8>D6, D9>D4, D9>D6, D9>(D4+D6+D8), etc.

FIG. 4C shows yet another configuration for a blade 170 with cutting edge 172, channels 174, and segments 176. In this case, two smaller channels 174 are provided immediately adjacent one another to form a larger combined channel with a substantially w-shaped configuration and overall width D10. Segments 176 have segment lengths D11, and the individual channels have respective notch depths D12 and D13. Any number of adjacent channels can be provided in this fashion provided that the above ratios and dimensions are generally maintained for dimensions D10 and D11. The channels in FIG. 4C are directional so as to be more effective in one direction, such as to the right in the figure.

Figure 5A:
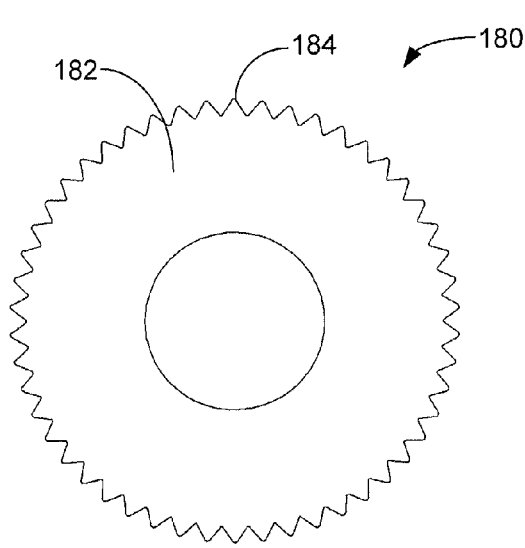
FIGS. 5A-5C illustrate a knurl that can be used to form channels of the types generally illustrated in FIGS. 2A-4C in accordance with some embodiments.
Figure 5B:
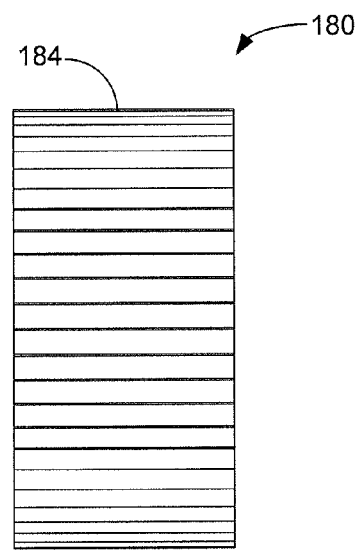
Figure 5C:
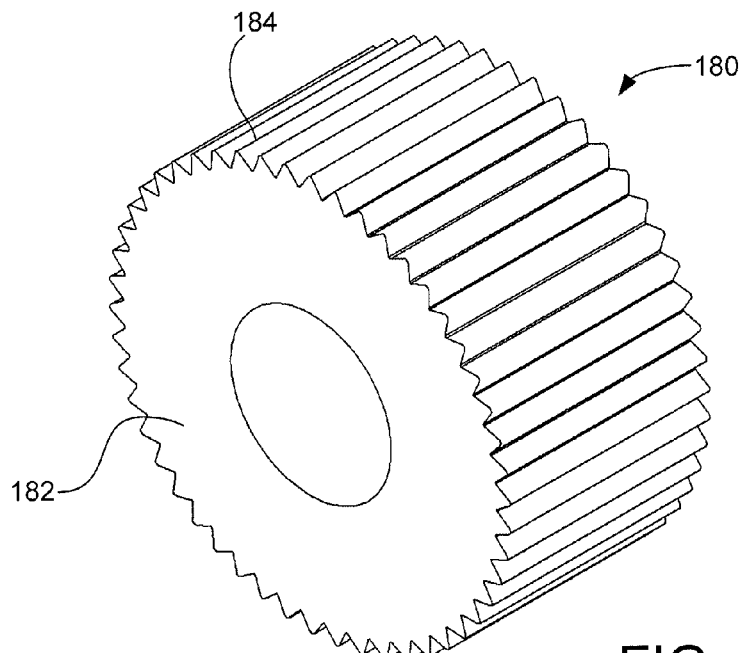

FIGS. 5A-5C illustrate a knurl roller 180 that can be used in accordance with some embodiments to form the channels discussed herein. The knurl roller 180 comprises a hard cylindrical member made of metal or other suitable material with a projection pattern about an exterior circumference thereof configured to be transferred to a corresponding workpiece upon the application of force thereto. In the embodiment of FIGS. 5A-5C, the knurl roller 180 takes a gear configuration with a cylindrical body 182 and radially spaced, radially and longitudinally extending teeth (projections)184. The teeth are substantially triangular in shape, although other shapes, spacings and patterns of projections can be used including irregular patterns and sequences of projections. It will be appreciated that an irregular pattern of projections on an associated roller will nonetheless provide a repeatable pattern of channels and segments on each of a population of blades that are each individually subjected to the associated roller.

The knurl roller 180 forms the channels using a cold forging process (also referred to as a roll forming process). As shown in FIG. 6A, a blade 190 with cutting edge 192 is placed in a selected orientation, such as along a substantially vertical insertion plane. The knurl roller 180 is adapted for rotation about a central axis 194 at a selected angle θ with respect to the blade 190. It will be noted at this point that the angle of the roller 180 will nominally establish the angle of the base portion 114A of the respective channels 110 (see e.g., FIGS. 2A and 2E).

The blade 190 is advanced along the vertical insertion plane so that the cutting edge 192 contactingly engages the roller 180 via contact force F, as depicted in FIG. 6B. The blade 190 is then drawn longitudinally in direction 198 as depicted in FIG. 6C so that the roller 180 rolls along the length of the cutting edge (or a desired portion thereof). The teeth 184 of the roller 180 come into contact with, and locally deform, the cutting edge 192 as the roller 180 rotates in rotational direction 196 and the blade 190 is translated along direction 198.

The surface pressure imparted by the teeth 184 forges (deforms or displaces) the material of the blade 190 to form spaced apart projecting channels 199 along the length of the cutting edge 192. Depending on the angle θ, the magnitude of the force F and the respective material configuration of the blade and the roller, the displaced material may project beyond one or both sides of the blade. This deflected material can be maintained on the blade, or a secondary honing operation using a suitable abrasive (such as a leather strope or similar) can be applied to remove the displaced material and substantially align the channel wall with the exterior tapered surfaces of the blade, as generally represented in FIG. 2A.

An advantage of the use of a cold forging process to form the channels is the quick and easy manner in which the features can be generated. A single pass of the blade against the knurl roller (or other forging member) while applying moderate force upon the blade may be sufficient in most cases to form the respective channels. Although the applied force is light, the resulting surface pressure is relatively high because only a single projection, or a few projections, are in contact with the blade at any given time, and the projections are so small that the applied pressure is high. Secondary honing can be applied with a single or a few strokes of the blade to remove the displaced material. Substantially any knife or other cutting tool can be subjected to this processing. Another advantage of cold forging is that, depending upon the material, the metal of the blade in the vicinity of the channels may tend to be work hardened, thereby providing localized zones of material with enhanced hardness and durability as the material is locally deformed.

To the extent that subsequent passes are required to re-form the channels during a subsequent resharpening operation, the knurl roller 180 will tend to align with the existing channels 199 so that the channels are formed in the same locations during subsequent cold forging passes. Such alignment has been found to occur because the distal ends of the knurl teeth 184 tend to engage the existing channels as the cutting edge 192 is drawn across the roller 180. Once engaged, the roller 180 will turn in a keyed fashion to the previously embossed pattern of channels. Any number of rollers can be concurrently applied to the blade to form different channel patterns. In another embodiment, the blade 190 can be held stationary and the roller 180 can be rollingly advanced therealong to form the channels 199. Motive power can be applied to the blade 190 and/or the roller 180 during the channel forming process as desired.

While the cold forging process depicted in FIGS. 6A-6C can be characterized as a roll forming process using the rolling action of the roller 180, other cold forging processes can be applied including ones in which a non-rolling forging member is directly pressed against the cutting edge to form the channels without relative rotational movement of the blade with respect to the forging member. These and other alternative configurations will readily occur to the skilled artisan using the present disclosure as a guide.

Other processes besides cold forging can be used to form the channels as required. Such processes can include, but are not limited to, stamping, grinding, laser cutting, plasma cutting, etching, embossing, etc. The particular process employed will depend upon the requirements of a given application.

FIGS. 7A-7E show aspects of another blade 200 processed in accordance with FIGS. 6A-6C. FIG. 7A shows a portion of a pristine blade 200 that has been sharpened to a fine cutting edge 202 by the convergence of opposing tapered surfaces 204, 206 and primary surfaces 208, 210. Such a blade may be characterized as having a fine edge since the cutting edge 202 is substantially continuously linear or curvilinear along its length without significant deviations or discontinuities.

FIG. 7B shows a portion of the blade 200 after having been subjected to the cold forging operation of FIG. 6B. Cup-shaped projecting channels 212 extend through the cutting edge 202 and are formed by the localized deformation of the blade material by the roller 180. FIG. 7C shows deflected material 214 making up the projecting channels 212.

FIGS. 7D and 7E show the results of a secondary sharpening (honing) operation to substantially remove the deflected material 214. This provides shaped channels 216 with sidewalls that nominally align with the tapered surfaces 204, 206, as best illustrated in FIG. 7E. The angle of the base portion of interior sidewall 218 nominally corresponds to the angle θ along which the teeth 182 extend (see FIG. 6A). The honing operation exposes the new cutting edges, denoted at 216A.

Figure 8A:
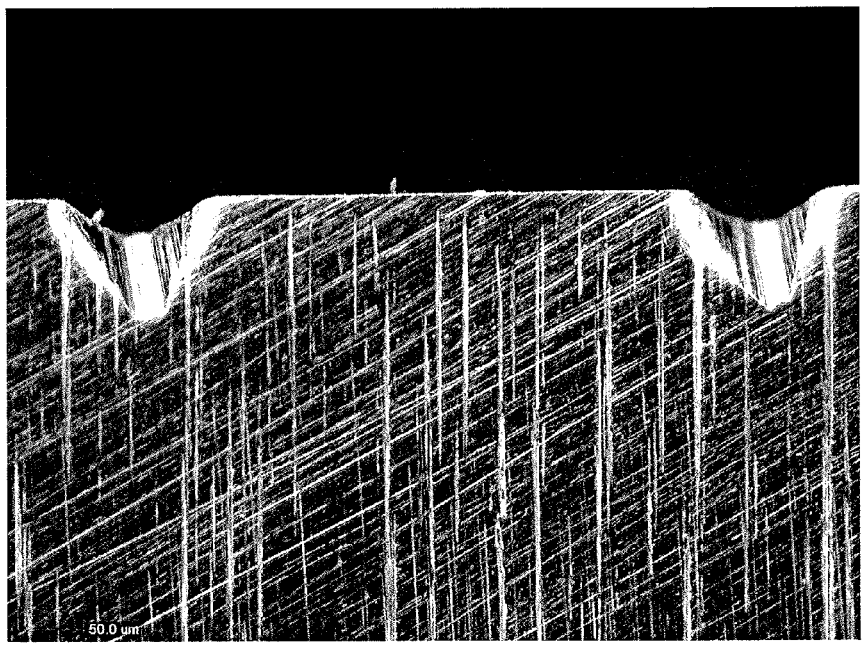
FIGS. 8A-8B provide microscope photos of a section of a cutting tool having channels forged therein in accordance with some embodiments.
Figure 8B:
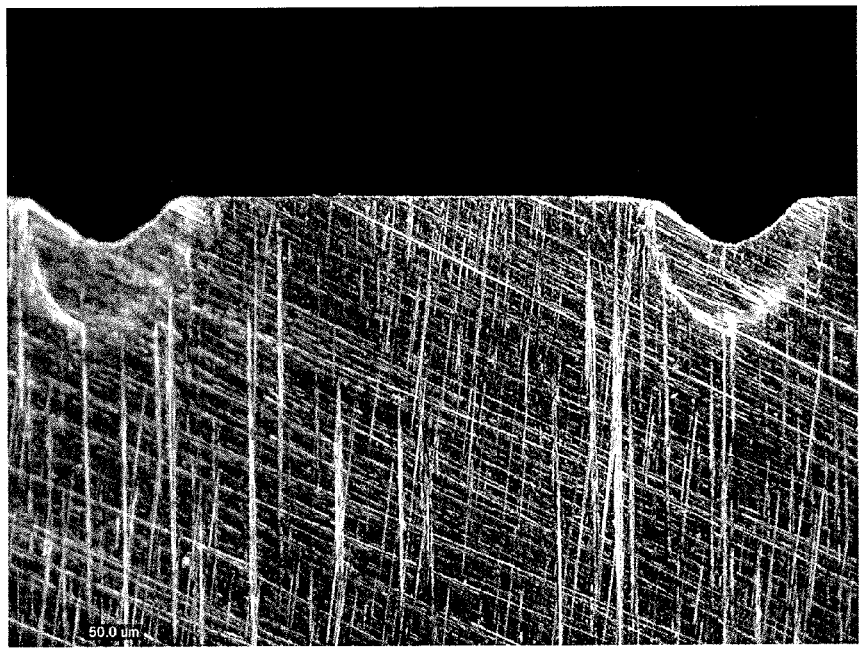

FIGS. 8A-8B show microscope photographs (photos) of an exemplary blade in which channels have been formed using a cold forging process as discussed in FIGS. 6A-6C. FIG. 8A shows a front side of the blade, and FIG. 8B shows a back side of the blade. For reference, magnification power for all photos presented herein is 575×; that is, the portion of the blade shown in each photo in this application is 575 times (575×) larger than what would normally be observed by the unaided human eye. The photos demonstrate the channels are microscopically scaled since the presence of the channels, or at least the notches at the narrowest depths of the channels, are not normally detectable to the unaided human eye, nor detectable through casual tactile contact with the cutting edge.

For reference, the blade is described as having a "notched edge" configuration with channels formed in a fine edge, similar to the blade 200 in FIGS. 7A-7E. The cross-hatched abrasive pattern visible in FIGS. 8A-8B show that multiple sharpening operations were applied to the blade in different directions; the substantially vertical lines resulted from application of a relatively fine grit abrasive to shape the tapered surfaces, and the diagonally extending lines (see FIG. 8B) resulted from a honing operation using a leather strope or similar fine abrasive to polish the edge and remove the deflected material (see FIG. 7C).

The base surfaces of the channels in FIGS. 8A-8B extend at a non-orthogonal angle of about 45 degrees with respect to the medial plane of the blade. Each of the channels takes a generally v-shaped configuration. The channels are about 0.005 in. in width, and a notch depth (minimum channel depth) of about 0.002 in. in depth, and the lengths of the intervening cutting edge slicing segments (distance from the edge of one channel to the next) are about 0.015 in.

Figure 9A:
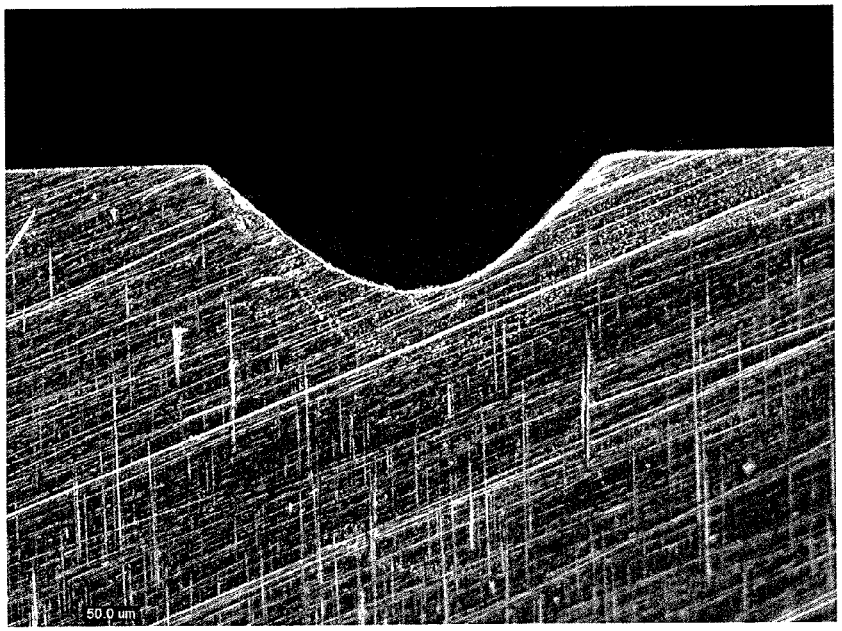
FIGS. 9A-9B provide microscope photos of a section of another cutting tool having channels forged therein in accordance with other embodiments.
Figure 9B:
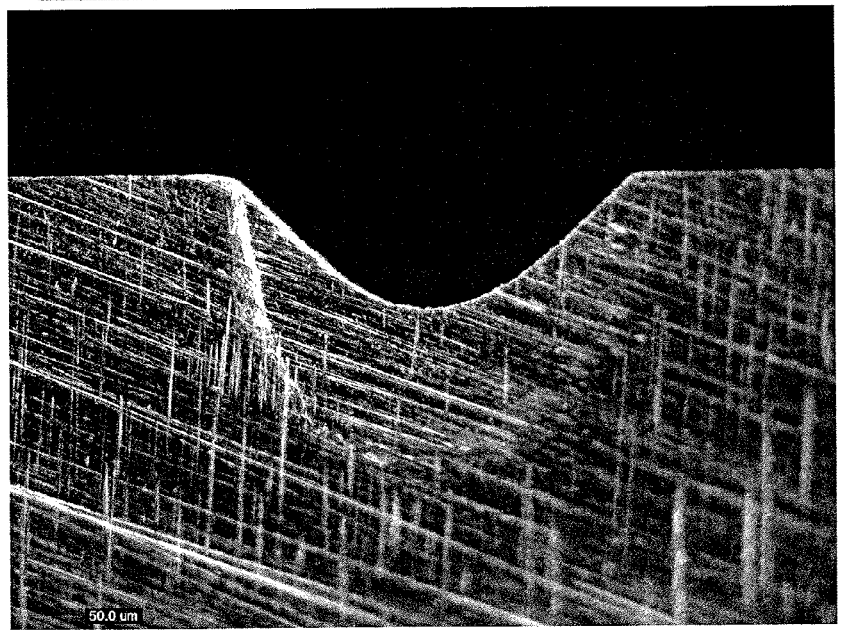

FIGS. 9A-9B provide another set of microscope photos for another fine edge blade with a notched edge configuration. The channels take a general u-shaped configuration and are substantially oriented at about 90 degrees with respect to the medial plane. Because the bottom of the channel is substantially horizontal, the front and back sides of the blade expose about the same amount of material through each channel. The channels have a channel width of about 0.015 in. and a notch depth of about 0.005 in. For reference, the surfaces of the blade adjacent the channel in the photos of FIGS. 9A-9B are flat; the curves that extend below the channel (best viewed in FIG. 9B) denote changes to the grain structure of the blade as a result of the roll forming process. It is believed this provides photographic evidence of work hardening of these areas. It is noted that the channels in FIGS. 8A-8B and FIGS. 9A-9B were formed using the same knurl roller, but with the application of a different amount of force and a different effective roller angle (e.g., 45 degrees v. 90 degrees).

It has been found that the application of channels as disclosed herein improve the wear characteristics of a given blade. The channels significantly extend the operational life of the blade so that the blade maintains its cutting ability for a longer period of time, which reduces the need to subject the blade to resharpening operations to maintain the cutting capability of the blade. This characteristic has been observed for a wide variety of different types and styles of knives and other cutting tools.

Figure 10:
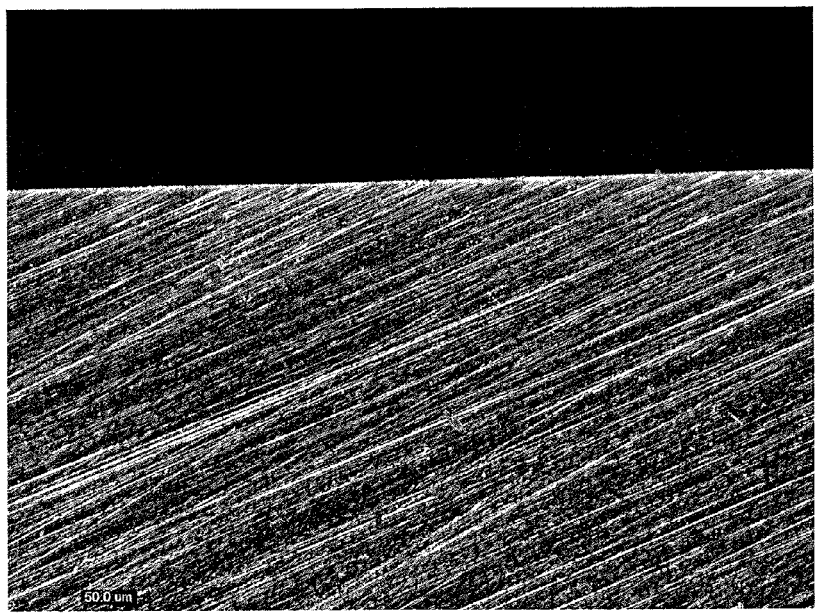
FIG. 10 is a microscope photo of a section of another cutting tool having a fine (refined) sharpened edge.

To illustrate this, FIG. 10 has been provided to show a microscope photo of a portion of a blade having a highly polished fine edge, generally similar to the pristine fine edge represented in FIG. 7A above. The fine sharpened edge, also referred to as a refined edge, is achieved through the application of multiple, successive sharpening processes to form a well defined cutting edge that continuously extends across the width of the photo. No channels have been formed in this blade.

Fine sharpened edges such as in FIG. 10 can be achieved in a variety of ways using a variety of sharpening techniques. The edge in FIG. 10 was achieved by passing opposing sides of the blade against an abrasive block of relatively fine abrasiveness level while maintaining the blade at a selected angle, followed by passing the blade against a leather strope or other honing abrasive to polish the distal edges of the blade. The diagonal lines resulted from the final polishing of the edge. Fine sharpened edges are provided on a variety of knives and other tools, such as relatively high quality kitchen knives (e.g., chef knives, etc.) used to cut a variety of plant and animal based foodstuffs.

Figure 11:
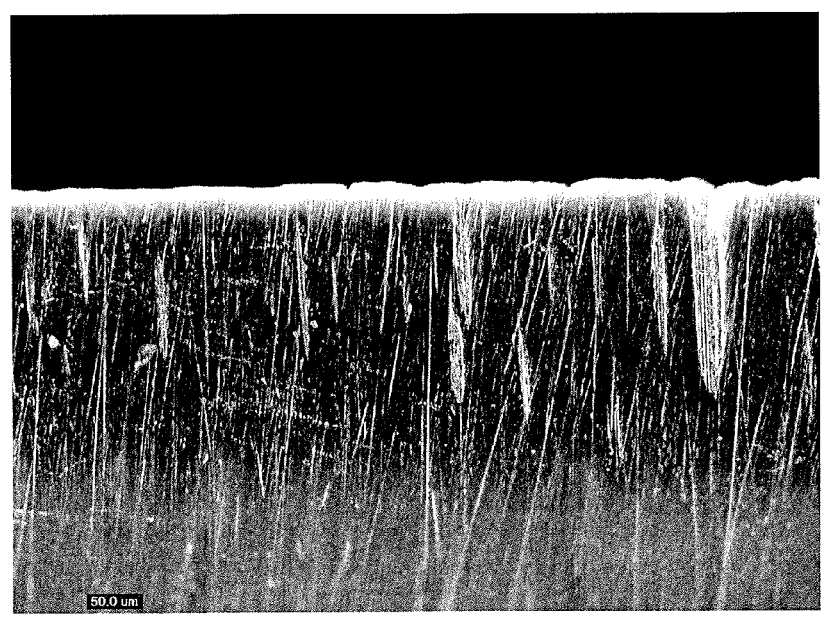
FIG. 11 is a microscope photo of a section of another cutting tool having a course (factory) sharpened edge.

FIG. 11 shows a microscope photo of a portion of a blade having a coarse sharpened edge (also sometimes referred to as a "factory edge"). A coarse sharpened edge is similar to a fine sharpened edge except that the sharpening process provides an edge that is somewhat discontinuous or "jagged" along its length, as can be seen from a comparison of FIG. 11 to FIG. 10. As before, no channels as described herein have been formed in this edge.

A coarse sharpened edge as in FIG. 11 can be achieved by applying a sharpening process using a relatively coarser abrasive to sharpen opposing sides of the blade and/or discontinuing the sharpening process without applying a honing operation to smooth out the end of the blade material to produce a fine edge as in FIG. 10. Stated another way, the coarse edge in FIG. 11 could be converted to a fine edge as in FIG. 10 should additional honing be applied to the blade, since the continued removal of material would ultimately refine the edge to a continuous line as in FIG. 10. It will be appreciated that some honing can be applied to a course edge blade as in FIG. 11, just not as much as applied to a refined edge as in FIG. 10.

Many commercially available knives, such as pocket knives and other utility knives, are often manufactured to have a coarse edge as in FIG. 11; the configuration of the edge makes it suitable to cut various materials such as rope or other tough and fibrous materials. Channels such as disclosed herein can be readily applied to blades having a coarse edge as in FIG. 11 or a fine edge as in FIG. 10 to extend the operational life thereof.

The process of cutting a medium using a cutting tool is deceptively complex. As used herein, cutting can be defined as a process in which a cutting edge of a tool contactingly engages the medium with a cutting edge using sufficient applied force such that the resulting surface pressure imparted by the cutting edge mechanically separates the medium. Cutting requires overcoming the effective compressive and/or tensile capabilities of the medium at or proximate the point of contact with the cutting edge.

The actual process of cutting a medium can be carried out in a number of ways. A plunge cut generally involves advancement of the blade through the medium without substantially any longitudinal movement of the cutting edge along the length thereof. By contrast, slicing (a "slice cut") generally involves some relative longitudinal movement of the cutting edge with respect to the medium while advancing the blade in a plunge cut direction.

Figure 12:
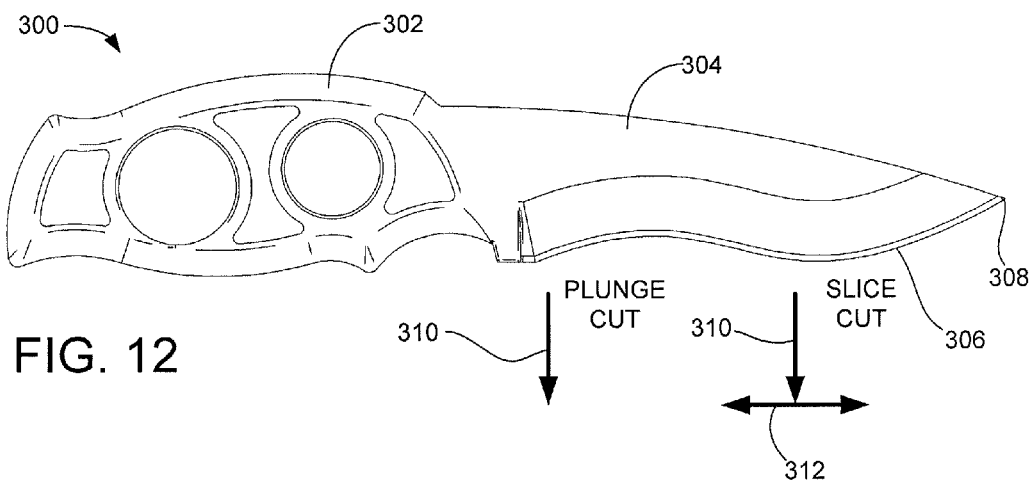
FIG. 12 depicts a utility knife having channels in accordance with various embodiments.

An exemplary utility knife 300 is shown in FIG. 12 having a handle 302, a blade 304 and a cutting edge 306 which extends from a position adjacent the handle 302 to a distal point 308. A plunge cut generally involves translation of the blade 304 in direction 310. A slice cut (slicing operation) generally involves translation of the blade 304 in direction 310 while advancing the blade in longitudinal direction 312. A plunge cut might be used to cut a relatively soft medium such as a hardboiled egg or a block of putty. Slicing might be used to cut a more fibrous medium such as a tomato or a piece of rope. It will be noted that curvilinearly extending blades such as in FIG. 12 tend to induce some measure of slicing action upon the medium being cut even if the blade is advanced in a purely plunge cut direction (e.g., arrow 310) since the effective angle of the cutting edge is not parallel to the surface of the medium.

It has been found that each of the sharpened notched edge, fine edge and coarse edge blades of FIGS. 8A-11 exhibit excellent plunge cut and slicing properties. Indeed, the fine edge blade tends to exhibit, in most cases, the best (e.g., highest) cutting efficiency using both plunge cuts and slicing for a wide variety of media. Cutting efficiency can be measured in a variety of ways. As used herein, the efficiency of a plunge cut can be characterized in terms of the applied force required to execute the plunge cut, so that a lower applied force equates to a higher efficiency. The efficiency of a slice cut can be characterized in terms of the total length of travel of the blade relative to the medium to execute the slice cut, so that a shorter longitudinal distance traveled by the cutting edge during the slicing operation (e.g., arrow 312) equates to higher efficiency.

Figure 13A:
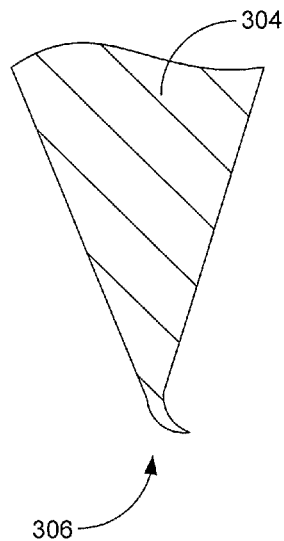
FIGS. 13A-13B represent the application of different dulling mechanisms that can reduce the cutting efficiency of the utility knife of FIG. 12.

The concept of "dulling" as used herein denotes a significant decrease in the cutting efficiency of a blade. Blades can become dull for a variety of reasons such as after extended use in performing various plunge and slicing cut operations. One well known dulling mechanism relates to mechanical deformation, or so-called "rolling" of the cutting edge as represented in FIG. 13A. More particularly, FIG. 13A shows a portion of the blade 304 from FIG. 12 with localized portions of the cutting edge 306 having been rolled, or deflected, to one side.

Figure 13B:
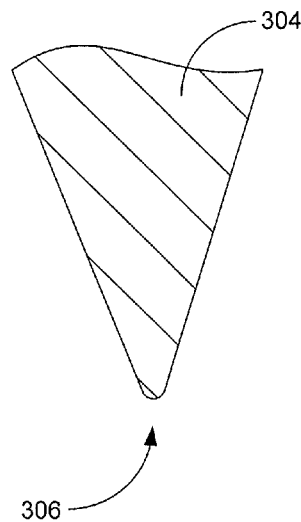

Another dulling mechanism is referred to as abrasion, or so-called "rounding" off of the end of the blade material as represented in FIG. 13B. Other dulling mechanisms are known including corrosion, which involves chemical interactions that tend to alter the crystalline alignment of the blade material at the cutting edge.

Figure 14:
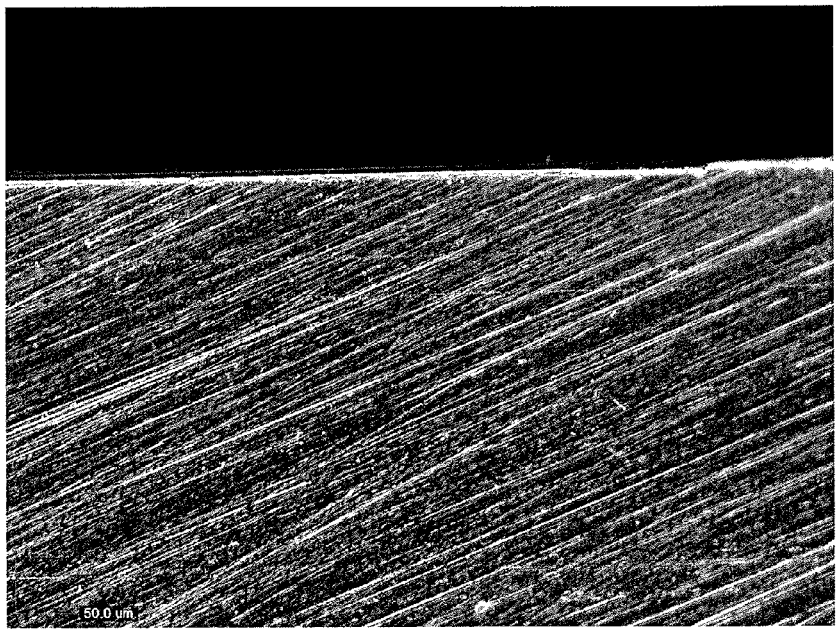
FIG. 14 is a microscope photo of a cutting tool having a refined sharpened cutting edge generally corresponding to FIG. 10, the cutting edge of the tool subjected to a dulling process.

FIG. 14 shows the fine edge blade of FIG. 10 after having been subjected to a dulling operation by intentionally placing the cutting edge against a rigid metal cylinder and translating the cutting edge along the length thereof while applying a relatively light cutting force. The cutting edge in FIG. 14 can be seen to have rolled over to one side in a manner similar to that represented in FIG. 13A.

Figure 15:
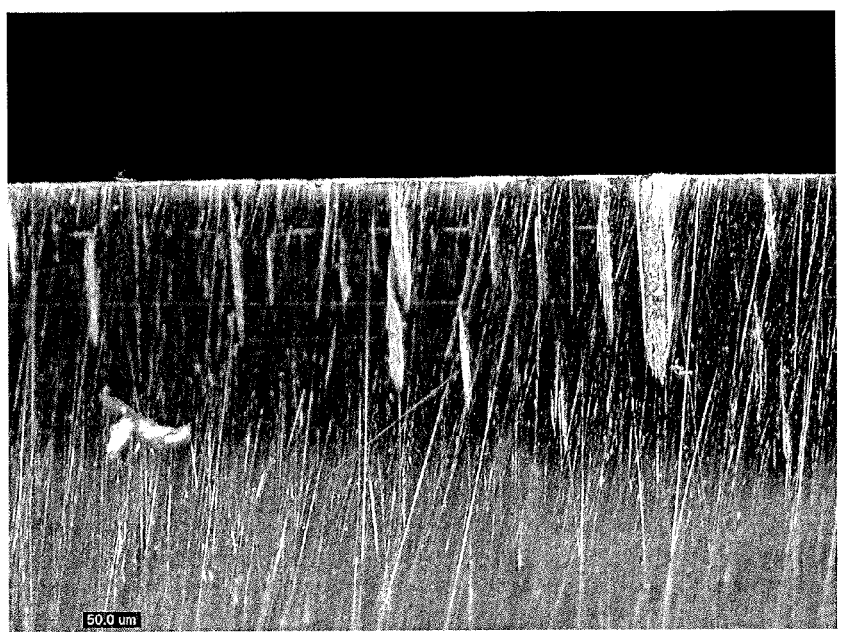
FIG. 15 is a microscope photo of a cutting tool having a coarse sharpened cutting edge generally corresponding to FIG. 11, the cutting edge of the tool subjected to a dulling process.

FIG. 15 shows the coarse edge blade of FIG. 11 after having been subjected to the same type of dulling operation as in FIG. 14. It can be seen that, due to the surface discontinuities provided by the dulling operation, the rolling operation of FIG. 13A extends in different directions with respect to the medial plane of the blade. Nevertheless, the dulled coarse edge blade in FIG. 15 exhibits similar rollover dulling.

Figures 16, 17:
FIG. 16 is a microscope photo of a cutting tool with a channel generally corresponding to FIGS. 8A-8B, the cutting edge of the tool subjected to a dulling process.
FIG. 17 is a table of test results obtained for the cutting tools of FIGS. 14-16 before and after the dulling process.

FIG. 16 shows the notched edge of FIG. 9A subjected to the same dulling operation as in FIGS. 14-15. While the sharpening segments between adjacent channels exhibits the same sort of rolling as in FIG. 14, the channels remain largely undisturbed by the dulling operation.

FIG. 17 provides tabulated data obtained from extended cutting tests performed upon fine edge (also "refined edge" blades), coarse edge (also "factory edge" blades) and notched edge (so-called "micro-forged" blades), as depicted in FIGS. 8A-11 and 14-16. Generally, a test protocol was established whereby cutting efficiency could be quantified using both plunge cuts and slice cuts of specially configured test media. Repetitive dulling was applied to the respective blades at a rate calibrated to generally correspond to real-world observed usage over time in terms of elapsed months. In one case, it was empirically determined that a single pass using an applied dulling force of about 12 grams on a smooth, hard metal cylinder can correspond to the equivalent "dulling" that an ordinary user can apply to a knife during real world usage of the knife over a month (30 days).

Figure 18:
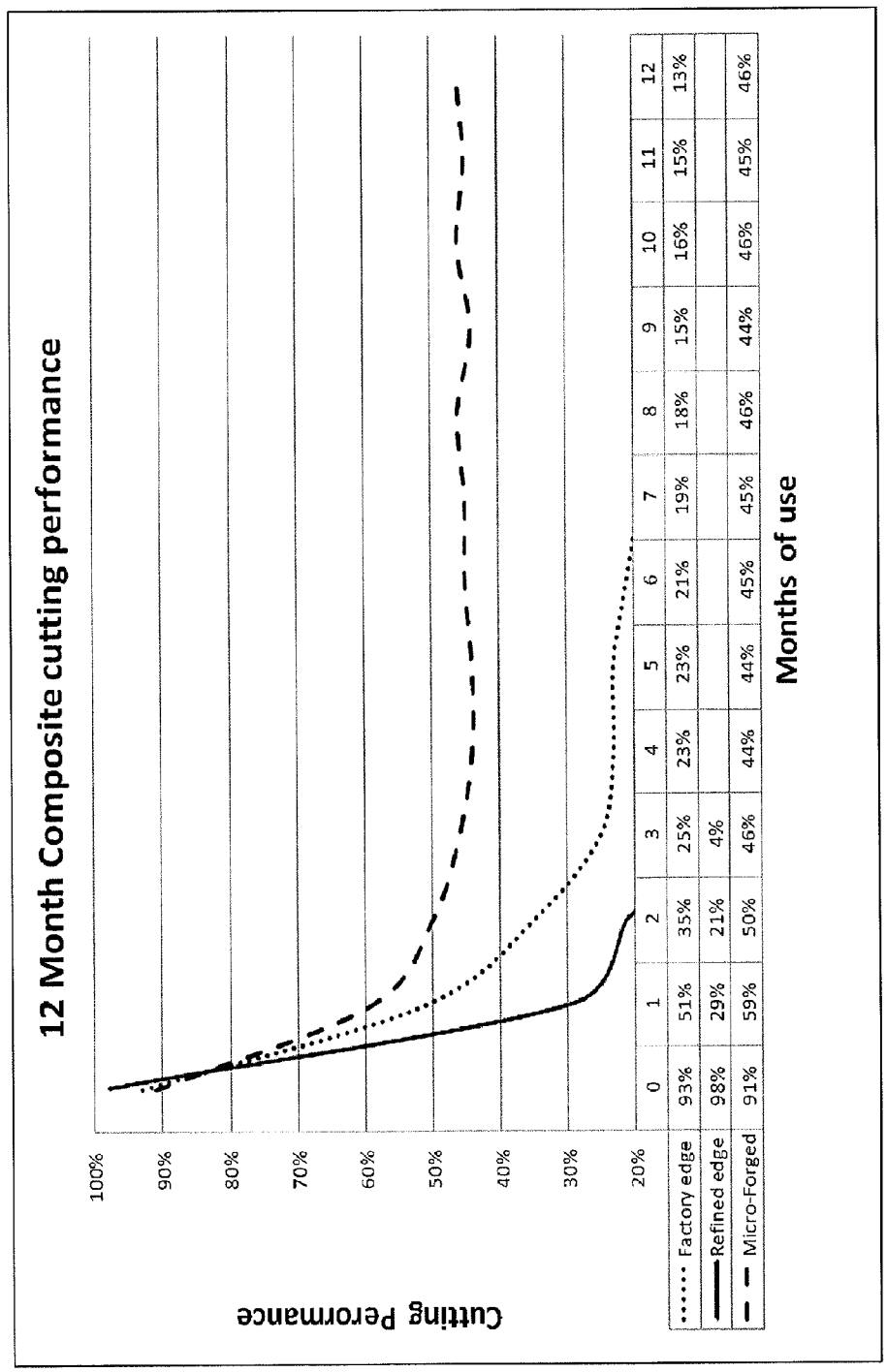
FIG. 18 is a graphical representation of data from FIG. 17.

The data were normalized so that a cutting efficiency of 100% represents maximum practical cutting ability and 0% represents no practical cutting ability. Both plunge cutting and slicing efficiencies were combined into the final composite values tabulated in FIG. 17. FIG. 18 provides a graphical representation of the tabulated data from FIG. 17.

As can be seen from FIGS. 17-18, the initial testing of the respective blades in a pristine, non-dulled configuration (month 0) showed very high cutting efficiency for all three types of blades. The fine (refined) edge blade (see e.g., FIG. 10) had the highest initial efficiency at 98%, followed by the coarse (factory) edge (see e.g., FIG. 11) at 93% and the notched edge (micro-forged) blade (see e.g., FIG. 8A) at 91%. From this it may be concluded that, for a variety of cutting methods and media, a very sharp blade with a highly refined edge may present the most effective cutting profile.

However, the refined edge was also shown to become the dullest at the fastest rate. It can be seen that the refined edge quickly dropped off to an efficiency of only about 29% after the first equivalent "month" (month 1), to only about 4% after three equivalent months (month 3), and could not practically cut the test media at all after that.

The factory edge was shown to last longer, dropping in efficiency to 51% after the first effective month (month 1) and continued to steadily decline to a final efficiency of about 13% at the end of the last test (month 12).

The micro-forged (notched edge) blade had the lowest initial efficiency at 91%, although not significantly different from the efficiency of the pristine factory edge blade or the refine edge blade. However, as shown by both FIGS. 17 and 18, the rate of decay in efficiency, after dropping to about 59% after the first effective month (month 1), maintained a reasonably high effectiveness of around 45% for the remaining duration of the test (through month 12). The notched edge blades with the channels thus exhibited significantly better cutting performance than the refined and factory edge blades over the duration of the test.

Those skilled in the art will recognized that the data from FIGS. 17-18 generally correspond to real world performance; a truly sharp fine edge knife tends to exhibit exceptional cutting performance, but after a relatively short time tends to quickly degrade and become a knife that is relatively difficult to use because of the relatively accelerated dulling of the cutting edge. While not limiting, this rapid dulling is believed to arise from the rolling of the cutting edge along the length thereof as the relatively thin refined cutting edge encounters the cutting media (and potentially a hard cutting board supporting the media), such as represented in FIG. 13A.

The use of a honing steel or other mechanism can be used before each cutting operation to maintain a fine edge knife in an efficient condition, and some experienced chefs use such a sharpening implement before each use of the knife. Many more users, however, seldom use such honing operations and suffer from dull knives. This is why, for example, many users often select a serrated knife to perform a cutting task upon a relatively fibrous medium (such as a tomato); the dulled edge of an otherwise fine edge knife designed for this task cannot usually generate sufficient tension in the fibers to pierce the skin and initiate slicing of the medium. However, serrated blades tend to be limited to slicing operations since serrated knives are not typically effective in performing plunge cuts, particularly upon materials with small fibers such as herbs, rope, etc. Serrated blades also tend to shred or tear materials (unlike fine edge knives) and are therefore inappropriate for cutting delicate materials such as fish.

The coarse edge blade exhibits better long term performance than the fine edge blade, and while not limiting, this is believed to be in part due to the discontinuous nature of the cutting edge. While being subjected to the same dulling characteristics, it is believed that the irregularities in the cutting profile of a coarse edge are sufficient to enable the blade to retain some measure of cutting capability, possibly due to the fact that some portions of the cutting edge are rolled in a first direction and other portions of the cutting edge are rolled in an opposing second direction. The discontinuities between different directions of roll may therefore provide additional cutting surfaces that enhance the ability of the blade to continue to cut at a higher cutting efficiency than the unitary roll direction that may be imparted to a fine edge cutting edge.

By contrast, it has been discovered by the inventor that the use of the channels disclosed herein provides a cutting edge with superior, long lasting cutting ability. Testing results demonstrate that a cutting edge with channels, even if subjected to dulling of the sharpening segments between adjacent channels, provides the blade with the unexpected benefit of continuing to exhibit relatively consistent levels of cutting efficiency. In each case, it has been found that an existing knife, whether a fine edge knife, a coarse edge knife, a scalloped knife or a serrated knife, when provisioned with the channels as disclosed herein, obtains the unpredicted benefit of continuing to perform cuts suitable to the blade style over a significantly extended period of time. From a casual user's standpoint, the knife (of whatever type) appears to remain "sharper" longer.

It will be noted that the micro-forged knife and the refined edge knife of FIGS. 17-18 were nominally the same; the only substantive difference between the respective knives was the presence or absence of the microscopically sized channels (which were not visible to the testing personnel). Nevertheless, the refined edge knife dulled rapidly whereas the micro-forged knife continued to provide significant levels of cutting efficiency.

While not shown in FIGS. 17-18, the application of a honing steel or other resharpening operation to the dulled micro-forged edge of FIGS. 17-18 was found to restore the edge to its initial cutting efficiency levels (e.g., month 0) without removing or otherwise substantively affecting the channels, so that the knife continued operation at higher levels of cutting efficiency as before even after a resharpening operation.

As mentioned above, the channels as disclosed herein can be applied to any number of different types and styles of cutting tools, including tools with existing features (e.g., serrations, scallops, wavy profiles, etc.) designed to enhance cutting efficiency.

Figure 19:
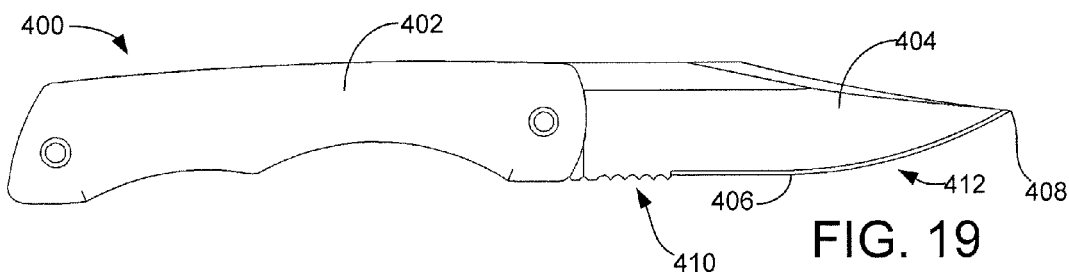
FIG. 19 depicts a pocket knife having channels in accordance with various embodiments.

FIG. 19 shows a cutting tool 400 in the form of a folding pocket knife. The knife 400 has a handle 402 and a blade 404 with a cutting edge 406 which extends to a point 408. Serrations 410 are formed along a first segment of the cutting edge 406, and a curvilinearly continuous portion 412 extends along a second segment of the cutting edge 406. It has been found that the channels can be applied to both serrations such as 410 (including larger and smaller serrations than those shown in FIG. 19), as well as to curvilinear segments such as 412. In such cases, cutting efficiency is enhanced and maintained by the addition of such channels.

Figure 20:
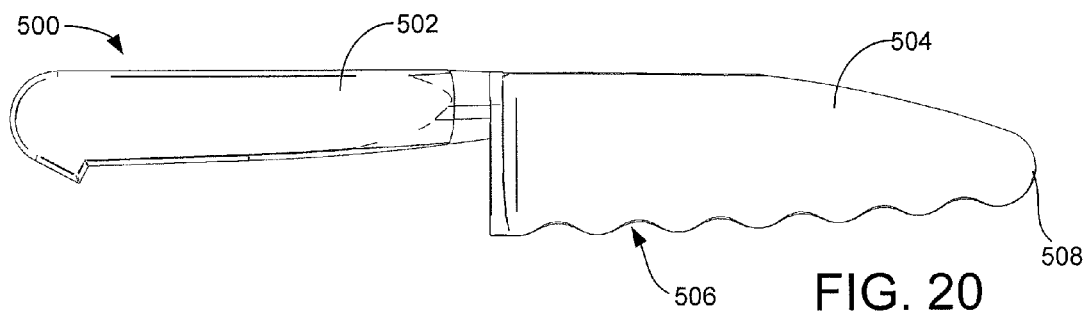
FIG. 20 is a scalloped kitchen knife having channels in accordance with various embodiments.

FIG. 20 shows a specially configured kitchen knife 500 with a scalloped profile. A handle 502 supports a blade 504 with cutting edge 506 which extends to distal end 508. The cutting edge 506 employs a so-called wave-shaped (e.g., sinusoidal) scallop profile. While such profile is intended to extend the cutting efficiency of the blade, the profile reduces the ability to cut relatively small media (e.g., herbs, etc.) and does not present a linear cutting line to the media, and therefore may not be suitable for a wide variety of cutting operations. Nevertheless, it has been found that the addition of channels to scalloped cutting edges as in FIG. 20 can enhance the cutting efficiency thereof.

Figure 21:
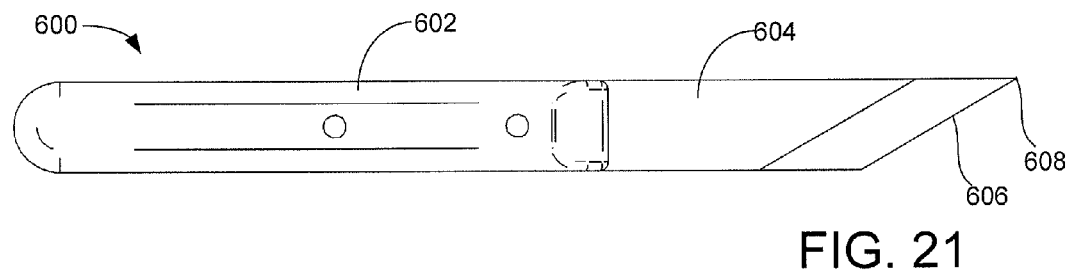
FIG. 21 is a utility knife having channels in accordance with various embodiments.

FIG. 21 shows a utility knife 600 with handle 602, blade 604, cutting edge 606 and distal end 608. The knife 600 is characterized as a razor blade style knife (e.g., a "box blade"). It has been found that channels can be added to the cutting edge 606 and enhance the cutting efficiency of the knife over time.

Figure 22:
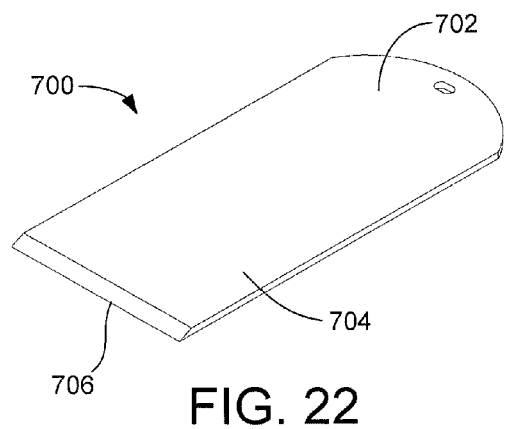
FIG. 22 is a plane iron having channels in accordance with various embodiments.

Other tools can benefit from the addition of the channels. FIG. 22 depicts a cutting tool 700 characterized as a plane iron or chisel type tool. A body portion 702 supports a blade portion 704 at one end with laterally extending cutting edge 706. Channels formed in the cutting edge can enhance the efficiency of this tool as well.

Figure 23:
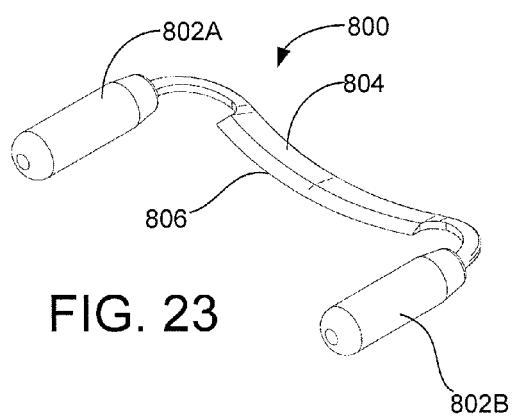
FIG. 23 is a shaving tool having channels in accordance with various embodiments.

FIG. 23 is a shaving tool 800 used to shape wood and other materials. A pair of handles 802A, 802B support opposing ends of an intermediate blade 804 with cutting edge 806. Channels formed in the cutting edge can enhance the efficiency of this tool as well. From the foregoing figures it can be seen that the channels as disclosed herein can be applied to substantially any cutting tool to enhance the cutting efficiency thereof.

Figure 24A:
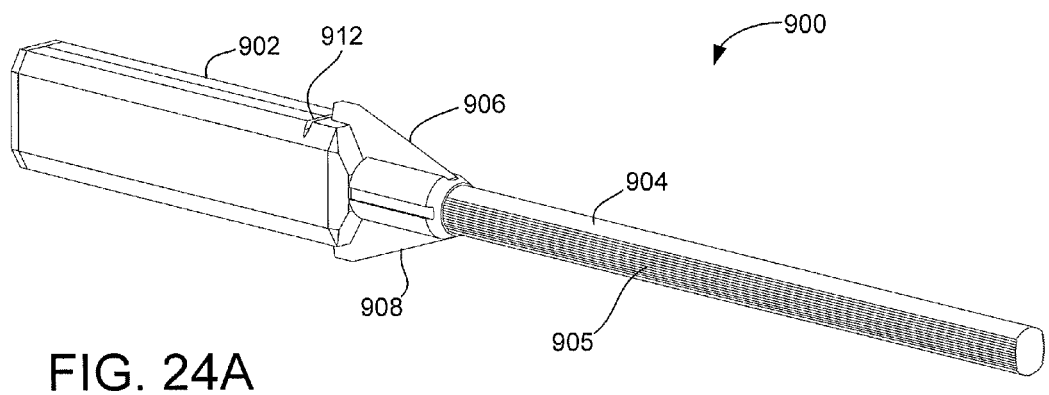
FIGS. 24A-24B depict a sharpener that incorporates the knurl roller from FIGS. 5A-5C to carry out sharpening operations upon a cutting tool in accordance with some embodiments of the present disclosure.

FIG. 24A illustrates a tool sharpener 900 constructed in accordance with some embodiments. The tool sharpener 900, also referred to as a knife sharpener, takes a general "sharpening steel" configuration. A handle 902 is provided that is adapted to be grasped by the hand of a user. A sharpening abrasive rod 904 extends from the handle 902 in a selected axial direction. The rod 904 can take a variety of configurations as desired, including a steel rod, an abrasive rod, etc. Ridges 905 can be formed along a portion of the rod so that the rod is supplied with different sharpening abrasiveness levels. In some cases, the rod 904 may be rotatable with respect to the handle 902.

Guides 906, 908 are provided to enable the user to set the angle of the knife or other cutting tool and then advance the knife along the length of the abrasive rod 904 while nominally maintaining the knife at the selected angle established by the associated guide.

Figure 24B:
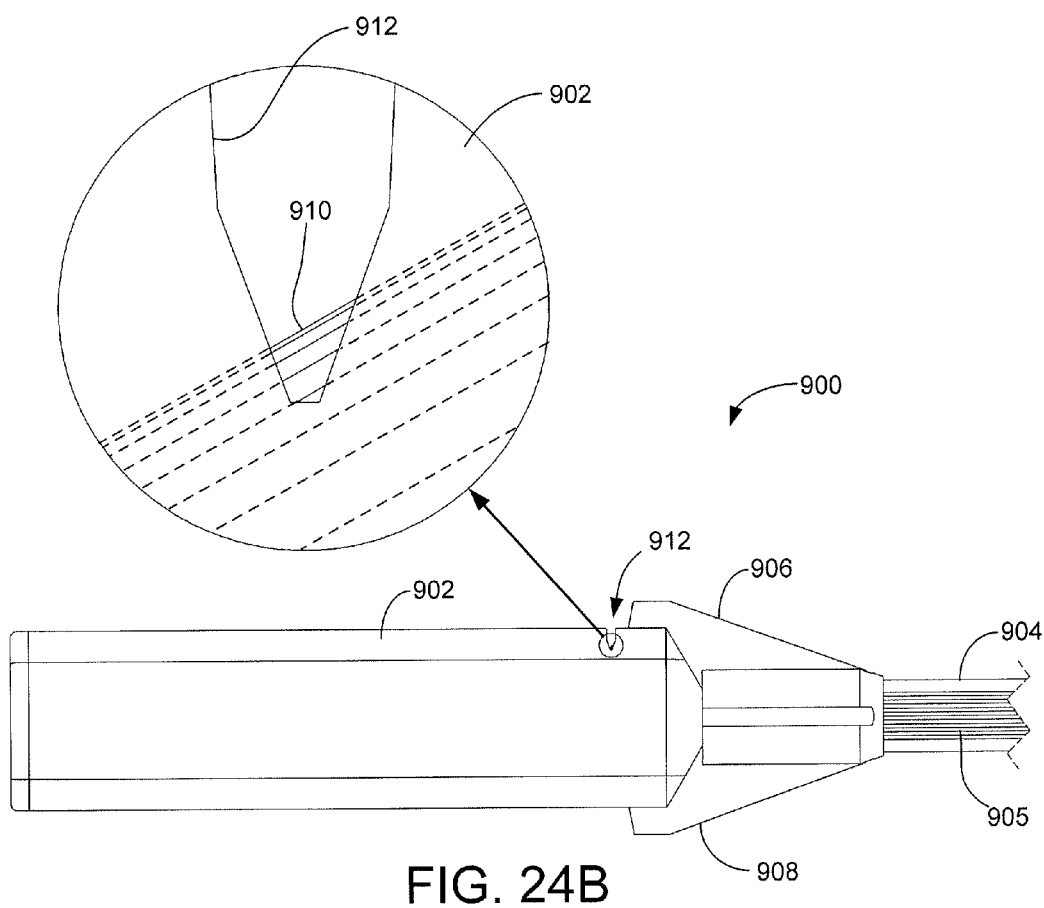

As represented in FIG. 24B, a knurl roller 910 is disposed within an interior cavity of the handle 902. The knurl roller 910 is mounted for rotation about a selected axis in a manner similar to the knurl roller 180 discussed above in FIGS. 6A-6C. A guide slot 912 is formed in the handle 902 and is adapted to enable a user to insert and retract a blade across an exposed portion of the roller 910 to form channels (e.g., 110, FIG. 1) as discussed herein.

Once the channels are formed, the side of the blade opposite the abrasive rod 902 can be placed onto one of the guides 906, 908 and the blade can be drawn along the abrasive rod a single time, or a few times, to remove the deflected material as discussed above.

By way of illustration, to sharpen a knife such as 400 in FIG. 19, a user of the sharpener 900 can hold the handle 902 in the left hand and hold the handle 402 of the knife 400 in the right hand. The user inserts the blade 404 of the knife 400 into the guide slot 912 so that the base of the cutting surface 406 adjacent the handle 402 is in contact with the knurl roller 910.

The user then uses the right hand to draw the cutting edge 406 against the knurl roller 910 as the knife 400 is retracted through the slot. Some upward rotation of the handle 402 may be applied to ensure the knurl roller 910 contacts the entire elongated length of the curvilinearly extending cutting edge 406. Only a moderate amount of downward force upon the knife 400 is required as the knife is drawn through the slot 912. In some cases, substantially the weight of the knife 400 may be sufficient so little or more additional force need be supplied by the user.

Once the knife 400 has been drawn a single pass through the slot 912, the user translates the knife using the right hand so that the side of the knife that was facing away from the abrasive rod 904 is brought into contacting alignment against upper guide 906. The user then moves the blade 404 along the abrasive rod 904 while laterally retracting the handle 402 and maintaining the blade nominally at the presentation angle established by the guide 906 so that substantially the entire length of the cutting edge 406 is brought against the abrasive rod. Such translation may include some amount of upward rotation of the handle 902 to ensure the entirety of the cutting edge 406 contacts the abrasive rod 904. Multiple passes can be used as desired. As described above, this secondary honing operation against the abrasive rod 904 removes the deflected material (see e.g., FIG. 2C) to define the final geometry of the channels formed by the roller 910.

The abrasive rod 904 is suitable for applying subsequent sharpening operations to one or both sides of the blade to reduce the dullness of the intervening segments (e.g., 112, FIG. 1) after a period of extended use. It is contemplated that such subsequent sharpening operations will tend to realign the segments 112 without substantially affecting the channels 110. Subsequent passage of the knife through the slot 912 can be carried out to redefine the channels, followed by secondary honing as described above.

Other configurations of sharpeners, including powered sharpeners, sharpeners that utilize abrasive materials in the form of discs, blocks, belts, stropes, etc. can be used to incorporate a knurl roller or other cold forging member as described herein. These and other alternatives will readily occur to the skilled artisan in view of the present disclosure and are encompassed within the subject matter of the present disclosure.

It is to be understood that even though numerous characteristics and advantages of various embodiments of the present disclosure have been set forth in the foregoing description, together with details of the structure and function of various embodiments thereof, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A tool sharpener comprising:
a rigid body having a slot extending therein;
a knurl roller disposed within an internal cavity within the rigid body and mounted for rotation about a selected axis adjacent the slot to facilitate a cold forging operation upon a cutting edge of a cutting tool via insertion of the cutting edge into the slot and retraction of the cutting tool across the knurl roller to form a sequence of spaced apart channels along the cutting edge; and
an abrasive member affixed to the rigid body to facilitate a sharpening operation by advancement of the cutting edge thereacross.

2. The tool sharpener of claim 1, wherein the rigid body is characterized as a handle having an outer grip surface adapted to be grasped by a hand of a user.

3. The tool sharpener of claim 1, wherein the abrasive member is characterized as an abrasive rod that extends in a selected axial direction from the housing.

4. The tool sharpener of claim 3, wherein the abrasive rod is a steel rod.

5. The tool sharpener of claim 3, wherein the abrasive rod is a ceramic rod.

6. The tool sharpener of claim 1, wherein the abrasive member is rotatable with respect to the rigid body.

7. The tool sharpener of claim 1, wherein the abrasive member comprises a plurality of ridges.

8. The tool sharpener of claim 1, wherein the rigid body comprises a guide surface which extends adjacent the abrasive member to facilitate a user maintaining a side of the cutting tool at a selected angle with respect to the abrasive member during a sharpening operation.

9. The tool sharpener of claim 1, wherein the knurl roller comprises a hard cylindrical member with a projection pattern about an exterior circumference configured to be transferred to the cutting edge upon the application of force thereto, the knurl roller taking a gear configuration with a cylindrical body and radially spaced, radially and longitudinally extending teeth.

10. The tool sharpener of claim 9, wherein the abrasive member extends along a first axis, and the knurl roller rotates about a second axis non-orthogonal to the first axis.

11. A method for sharpening a cutting tool, comprising:
inserting a cutting edge of a cutting tool into a slot of a rigid body of a tool sharpener;
retracting the cutting edge across a rotatable knurl roller disposed within an internal cavity of the rigid body to facilitate a cold forging operation upon the cutting edge to form a sequence of spaced apart channels along a length of the cutting tool; and
subsequently advancing the cutting edge of the cutting tool along an abrasive member affixed to the rigid body to facilitate a sharpening operation upon the cutting edge.

12. The method of claim 11, wherein the subsequently advancing step further comprises placing a side surface of the cutting tool against a guide surface of the cutting tool adjacent the abrasive member to establish a selected angle of the tool with respect to the abrasive member, and advancing the cutting tool across the abrasive member while nominally maintaining the cutting tool at the selected angle.

13. The method of claim 11, wherein the rigid body is characterized as a handle having an outer grip surface adapted to be grasped by a hand of a user.

14. The method of claim 11, wherein the abrasive member is characterized as an abrasive rod that extends in a selected axial direction from the housing.

15. The method of claim 11, wherein the knurl roller comprises a hard cylindrical member with a projection pattern about an exterior circumference configured to be transferred to the cutting edge upon the application of force thereto, the knurl roller taking a gear configuration with a cylindrical body and radially spaced, radially and longitudinally extending teeth.

16. A method for sharpening a cutting tool having a blade with a cutting edge, the blade extending from a handle, the method comprising:
 providing a tool sharpener having housing, a knurl roller disposed within the housing for rotation about a selected axis adjacent a slot, and an abrasive member coupled to the housing;
 grasping the cutting tool using a hand of a user and inserting the blade into the slot;
 drawing the cutting edge across the knurl roller by using the hand of the user to retract the handle along a selected direction, the knurl roller forming spaced apart channels along a length of the cutting edge; and
 using the hand of the user to subsequently move the cutting edge along the abrasive member to sharpen the cutting edge and remove material from the blade displaced by the knurl roller.

17. The method of claim 16, wherein the using step further comprises placing a side surface of the cutting tool against a guide surface of the cutting tool adjacent the abrasive member to establish a selected angle of the tool with respect to the abrasive member, and advancing the cutting tool across the abrasive member while nominally maintaining the cutting tool at the selected angle.

18. The method of claim 16, wherein the housing is characterized as a handle having an outer grip surface adapted to be grasped by a hand of a user.

19. The method of claim 16, wherein the abrasive member is characterized as an abrasive rod that extends in a selected axial direction from the housing.

20. The method of claim 16, wherein the knurl roller comprises a hard cylindrical member with a projection pattern about an exterior circumference configured to be transferred to the cutting edge upon the application of force thereto, the knurl roller taking a gear configuration with a cylindrical body and radially spaced, radially and longitudinally extending teeth.

* * * * *